United States Patent
Arya

(10) Patent No.: US 12,200,466 B2
(45) Date of Patent: Jan. 14, 2025

(54) AUDIO ENHANCED AUGMENTED REALITY

(71) Applicant: Ashwani Arya, Cypress, CA (US)

(72) Inventor: Ashwani Arya, Cypress, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/218,752

(22) Filed: Jul. 6, 2023

(65) Prior Publication Data
US 2023/0362573 A1  Nov. 9, 2023

Related U.S. Application Data

(63) Continuation of application No. 17/323,511, filed on May 18, 2021, now Pat. No. 11,729,573.

(51) Int. Cl.
*H04S 7/00* (2006.01)
*G02B 27/01* (2006.01)
(Continued)

(52) U.S. Cl.
CPC .......... *H04S 7/303* (2013.01); *G02B 27/0176* (2013.01); *G06N 3/08* (2013.01); *H04R 5/04* (2013.01); *H04S 7/40* (2013.01); *G02B 2027/0138* (2013.01); *G02B 2027/0178* (2013.01); *H04S 2400/11* (2013.01); *H04S 2420/01* (2013.01)

(58) Field of Classification Search
CPC ........ H04S 7/303; H04S 7/40; H04S 2400/11; H04S 2420/01; G06F 3/167; G06F 3/16; G06F 3/165; G06F 1/163; G06F 3/011; G06F 3/048; G06F 3/012; G06F 3/013; G06F 18/24; G02B 27/0176; G02B 27/017; G02B 27/0172; G02B 2027/0138; G02B 2027/0178; G02B 2027/014; G02B 2027/0141; H04R 5/04; H04R 3/005; G06N 3/08; G06N 3/0464

See application file for complete search history.

(56) References Cited

U.S. PATENT DOCUMENTS

2005/0248717 A1 11/2005 Howell et al.
2007/0024579 A1 2/2007 Rosenberg
(Continued)

OTHER PUBLICATIONS

International Search Report and Written Opinion received in Patent Cooperation Treaty Application No. PCT/US2022/029148, dated Aug. 29, 2022, 10 pages.

*Primary Examiner* — Yogeshkumar Patel
(74) *Attorney, Agent, or Firm* — CM Law; Stephen J. Weed

(57) ABSTRACT

Devices, media, and methods are presented for an audio enhanced augmented reality (AR) experience using an eyewear device. The eyewear device has a microphone system, a presentation system, a support structure configured to be head-mounted on a user, and a processor. The support structure supports the microphone system and the presentation system. The eyewear device is configured to capture, with the microphone system, audio information of an environment surrounding the eyewear device, identify an audio signal within the audio information, detect a direction of the audio signal with respect to the eyewear device, classify the audio signal, and present, by the presentation system, an application associated with the classification of the audio signal.

20 Claims, 20 Drawing Sheets

(51) Int. Cl.
*G06N 3/08* (2023.01)
*H04R 5/04* (2006.01)

(56) References Cited

U.S. PATENT DOCUMENTS

| | | | |
|---|---|---|---|
| 2012/0235886 A1* | 9/2012 | Border | G06F 3/013 345/8 |
| 2013/0083173 A1 | 4/2013 | Geisner et al. | |
| 2017/0069143 A1* | 3/2017 | Salter | G06F 3/012 |
| 2018/0075659 A1* | 3/2018 | Browy | G06F 3/013 |
| 2018/0139565 A1 | 5/2018 | Norris et al. | |
| 2019/0342693 A1 | 11/2019 | Norris et al. | |
| 2020/0128348 A1 | 4/2020 | Eronen et al. | |
| 2020/0252741 A1 | 8/2020 | Lyren | |
| 2021/0082453 A1* | 3/2021 | Guo | G06N 3/045 |
| 2021/0092514 A1 | 3/2021 | Agarwala et al. | |
| 2021/0160644 A1 | 5/2021 | Olivieri et al. | |
| 2021/0249031 A1* | 8/2021 | Valerio Parise | H04R 1/406 |
| 2022/0091674 A1 | 3/2022 | Kemmerer et al. | |

* cited by examiner

AUDIO ENHANCED AUGMENTED REALITY

CROSS-REFERENCE TO RELATED APPLICATIONS

This application is a Continuation of U.S. application Ser. No. 17/323,511 filed on May 18, 2021, the contents of which are incorporated fully herein by reference.

TECHNICAL FIELD

Examples set forth in the present disclosure relate to portable electronic devices, including wearable devices such as eyewear, having audio enhancements for detecting audio, processing audio, presenting audio, and triggering applications.

BACKGROUND

Many types of computers and electronic devices available today, such as mobile devices (e.g., smartphones, tablets, and laptops), handheld devices (e.g., smart rings, special-purpose accessories), and wearable devices (e.g., smart glasses, digital eyewear, headwear, headgear, and head-mounted displays), include a variety of sensors, wireless transceivers, input systems (e.g., touch-sensitive surfaces, pointers), peripheral devices, and output devices.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more non-limiting examples. Included in the drawing are the following figures.

DETAILED DESCRIPTION

Figure 1A:
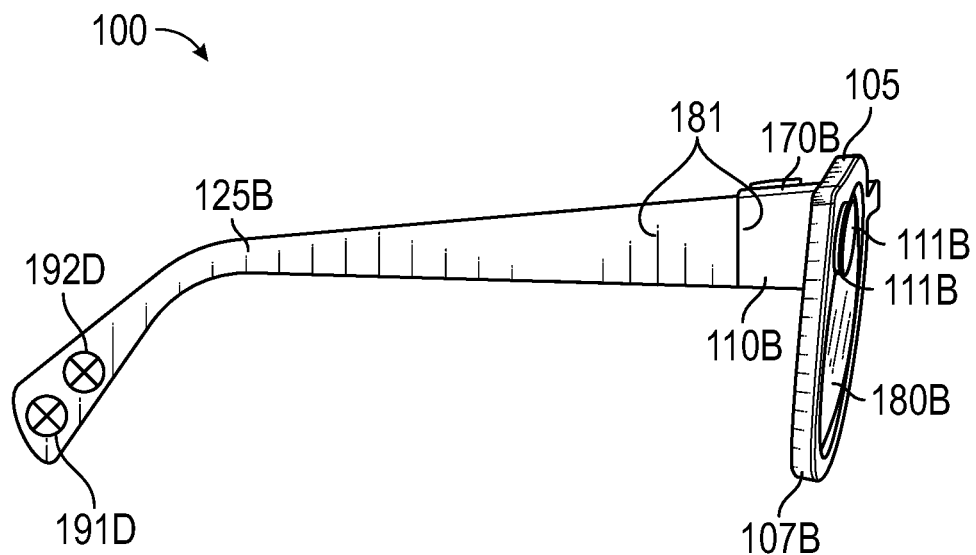
FIG. 1A is a side view (right) of an example hardware configuration of an eyewear device suitable for use in an augmented reality system.

Examples of devices, methods, and media are presented for an audio enhanced AR experience using an eyewear device. The eyewear device has a microphone system and a presentation system (e.g., speakers, displays, or a combination thereof). The eyewear device is configured to capture, with the microphone system, audio information of an environment surrounding the eyewear device, identify an audio signal within the audio information (e.g., dog barking, children laughing, birds chirping, automobile noise), detect a direction of the audio signal with respect to the eyewear device, classify the audio signal, and present, by the presentation system, an application (e.g., visual overlay, enhanced audio, Lens®) associated with the classification of the audio signal.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the eyewear device, the handheld device, associated components, and any other complete devices incorporating a camera and/or an inertial measurement unit such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera and/or inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims. Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible and/or include a raised or otherwise tactile edge that provides feedback to the user about the location and boundary of the touchpad 181. In other examples, the eyewear 100 may include a touchpad on the left side.

The surface of the touchpad 181 is configured to detect finger touches, taps, and gestures (e.g., moving touches) for use with a GUI displayed by the eyewear, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display and/or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Additionally, the eyewear device 100 includes at least two speakers, e.g., one or more speakers on a left side of the eyewear device 100 (left speakers 191A and 191C) and one or more speakers on a right side of the eyewear device 100 (right speakers 191B and 191D, for presenting audio signals to a left ear and a right ear of a wearer, respectively. An audio processor 413 (FIG. 4) of the stereo speaker system delivers audio signals to the speakers 191. The speakers 191 may be incorporated into the frame 105, temples 125, or corners 110 of the eyewear device 100. The speakers 191 are driven by audio processor 413 under control of low-power circuitry 420, high-speed circuitry 430, or both. The speakers 191 are for presenting audio signals including, for example, an audio track associated with a virtual object or virtual object theme. The audio processor 413 is coupled to the speakers 191 in order to control the presentation of sound (e.g., in accordance with head-related transfer function, head-related transfer function (HRTF), modeling) to provide acoustical position information corresponding to the location of virtual objects presented on the image displays of optical assemblies 180A-B. Audio processor 413 may be any processor capable of managing audio processing needed for eyewear device 100 (e.g., capable of HRTF and beam forming modeling).

In one example, the eyewear device 100 includes a left front speaker 191A, a right front speaker 191B, a left rear speaker 191C, and a right rear speaker 191D. The speakers 191 are positioned at various locations around the eyewear 100 to present directional audio zones for guiding a user wearing the eyewear device 100. For example, presenting an audio signal from both rear speakers 191C, D generates a rear directional audio zone indicating a virtual object is behind the wearer, presenting an audio signal from the right rear speakers 191D generates a right-rear directional audio zone indicating a virtual object is behind the wearer to the right, and presenting an audio signal from right front speaker 191B and the right rear speaker 191D generates a right side directional audio zone indicating a virtual object is to the right of the wearer. Volume of the audio signal may be adjusted to indicate proximity to an object with the volume increasing as the wear gets closer to the object. Additionally, relative volume among speakers may be set to provide more zones. For example, presenting an audio signal from the right front speaker 191B and the right rear speaker 191D where the volume is louder from right rear speaker generates a right side and back directional audio zone indicating a virtual object is to the right and back of the wearer, but not as far behind the wearer as when the signal is only presented by the right rear speaker 191D. In another example, the eyewear device 100 includes a left front speaker 191A adjacent the left ear and a right front speaker 191B adjacent the right ear. In accordance with this example, the audio processor applies HRTF modeling to the audio signals in order to provide directional information with the two speakers.

Additionally, the eyewear device 100 includes at least four microphones, e.g., two or more microphones on a left side of the eyewear device 100 (left microphones 192a and 192c) and two or more microphones on a right side of the eyewear device 100 (right microphones 192b and 192d, for capturing audio information including audio signals received adjacent a left ear and a right ear of a wearer, respectively. The eyewear device 100 may include more or fewer microphones. In one example, the eyewear device includes six microphone, e.g., three on each side. In another example, the eyewear device includes twelve microphones, e.g., positioned radially around the head of the user at approximately 30 degree intervals. In accordance with this example, the eyewear device 100 may include a strap configured to extend between the temples 125 and around the back of the head of the user to facilitate spacing of the microphones.

An audio processor 413 (FIG. 4) receives audio signals from the microphones 192. The microphones 192 may be incorporated into the frame 105, temples 125, or corners 110 of the eyewear device 100. The audio processor 413 under control of low-power circuitry 420, high-speed circuitry 430, or both processes the audio information to detect audio signals (e.g., by applying an audio discrimination filter). The microphones 192 receive audio information including, for example, audio signals associated with real objects in an environment (e.g., a dog barking, children laughing, a car horn, splashes from a waterfall, etc.). The audio processor 413 is coupled to the microphones 192 in order to process the received audio information (e.g., in accordance with beam forming algorithms and a classification engine) to determine acoustical position information corresponding to the location of objects in the environment and to classify those objects.

In one example, the eyewear device 100 includes a left front microphone 192a, a right front microphone 192b, a left rear microphone 192c, and a right rear microphone 192d. The microphones 192 are positioned at various locations around the eyewear device 100 to receive audio information from locations surrounding a user wearing the eyewear device 100. For example, receiving an audio signal predominantly from both rear microphones 192c, d indicates a rear directional audio zone indicating an object is behind the wearer, receiving an audio signal predominantly from the right rear microphones 192d indicates a right-rear directional audio zone indicating an object is behind the wearer to the right, and receiving an audio signal predominantly from right front microphone 192b and the right rear microphone 192d indicates a right side directional audio zone indicating an object is to the right of the wearer. Volume of the audio signal may be used to determine proximity to an object with the volume increasing as the wear gets closer to the object. In another example, the eyewear device 100 applies a beam forming algorithm to the audio signals from all microphones 192 in order to determine directional information. Although four microphones 192 are illustrated and described herein, it is contemplated that fewer microphone (e.g., two microphones) or more microphones (e.g., six microphones or more) may be present to detect audio information.

Figure 1B:
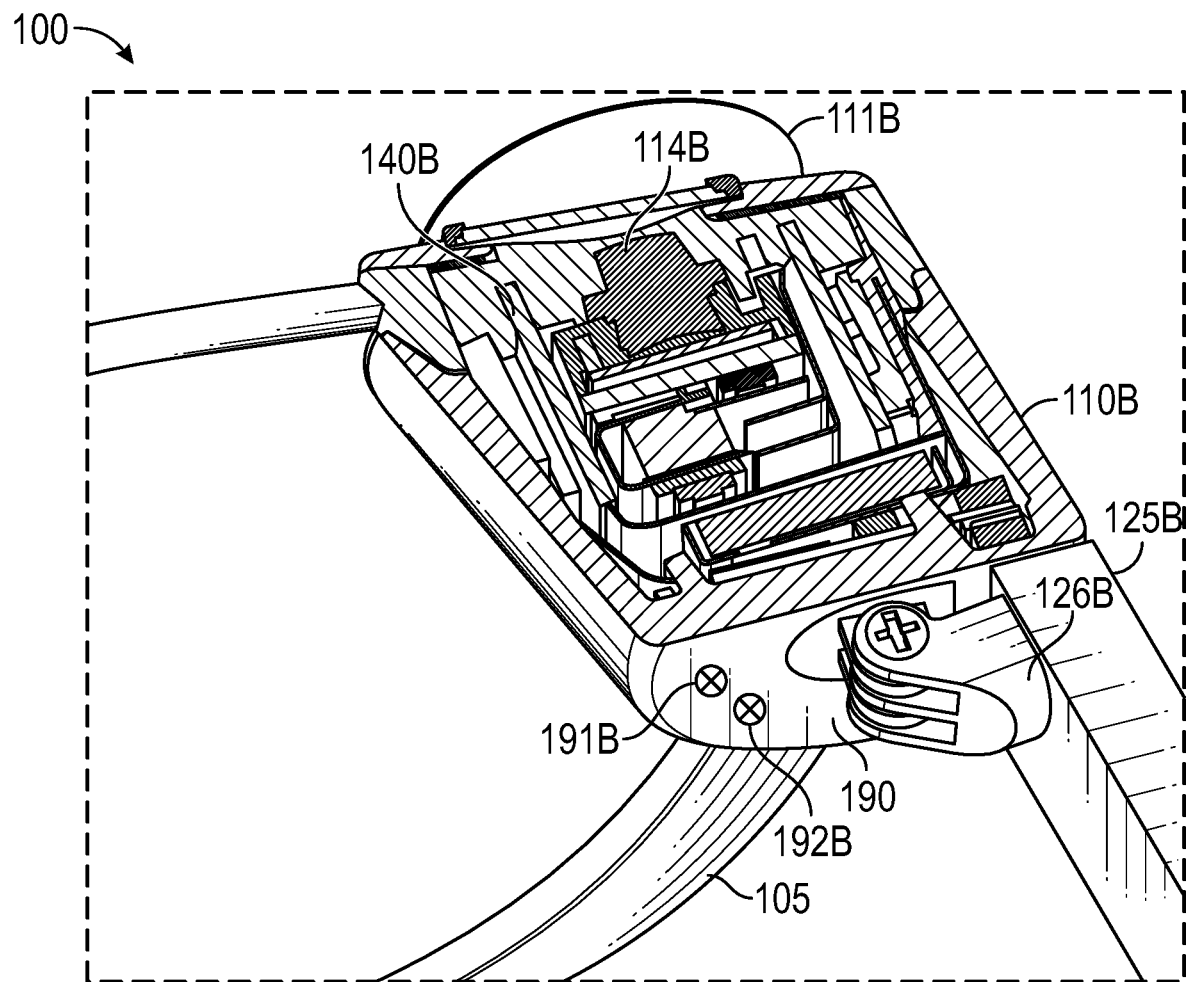
FIG. 1B is a top, partly sectional view of a right corner of the eyewear device of FIG. 1A depicting a right visible-light camera, and a circuit board.
Figure 1C:
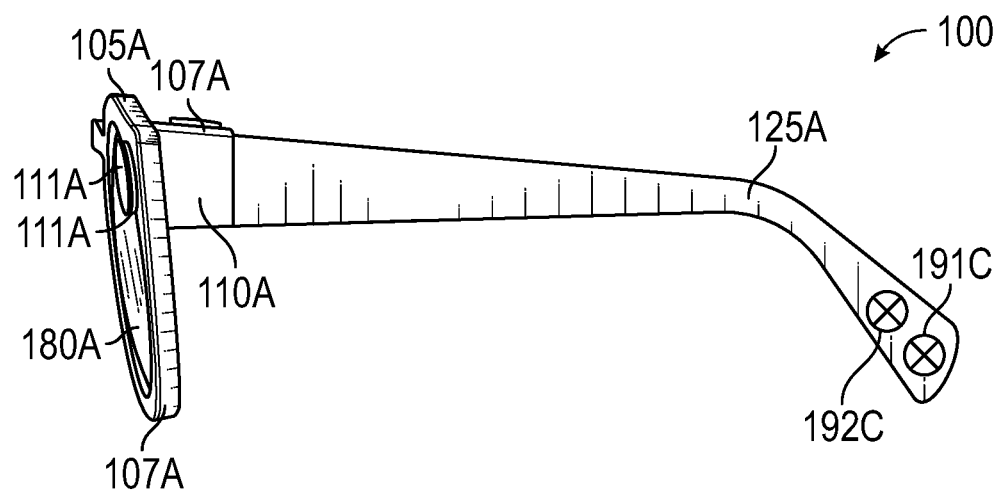
FIG. 1C is a side view (left) of an example hardware configuration of the eyewear device of FIG. 1A, which shows a left visible-light camera.
Figure 1D:
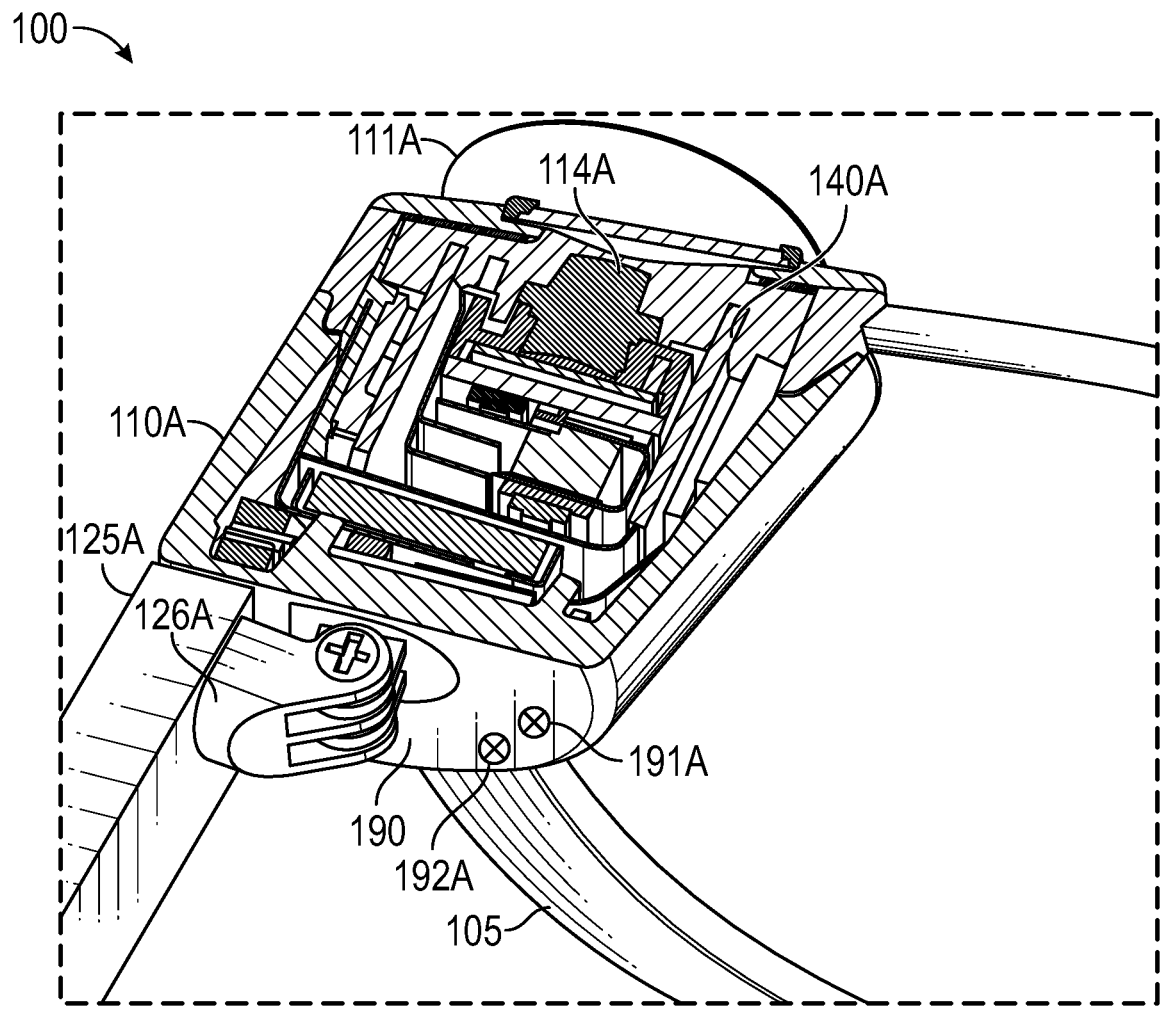
FIG. 1D is a top, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo cameras, of which the right visible-light camera 114B is located on a right corner 110B. As shown in FIGS. 1C-D, the eyewear device 100 also includes a left visible-light camera 114A.

Figure 3:
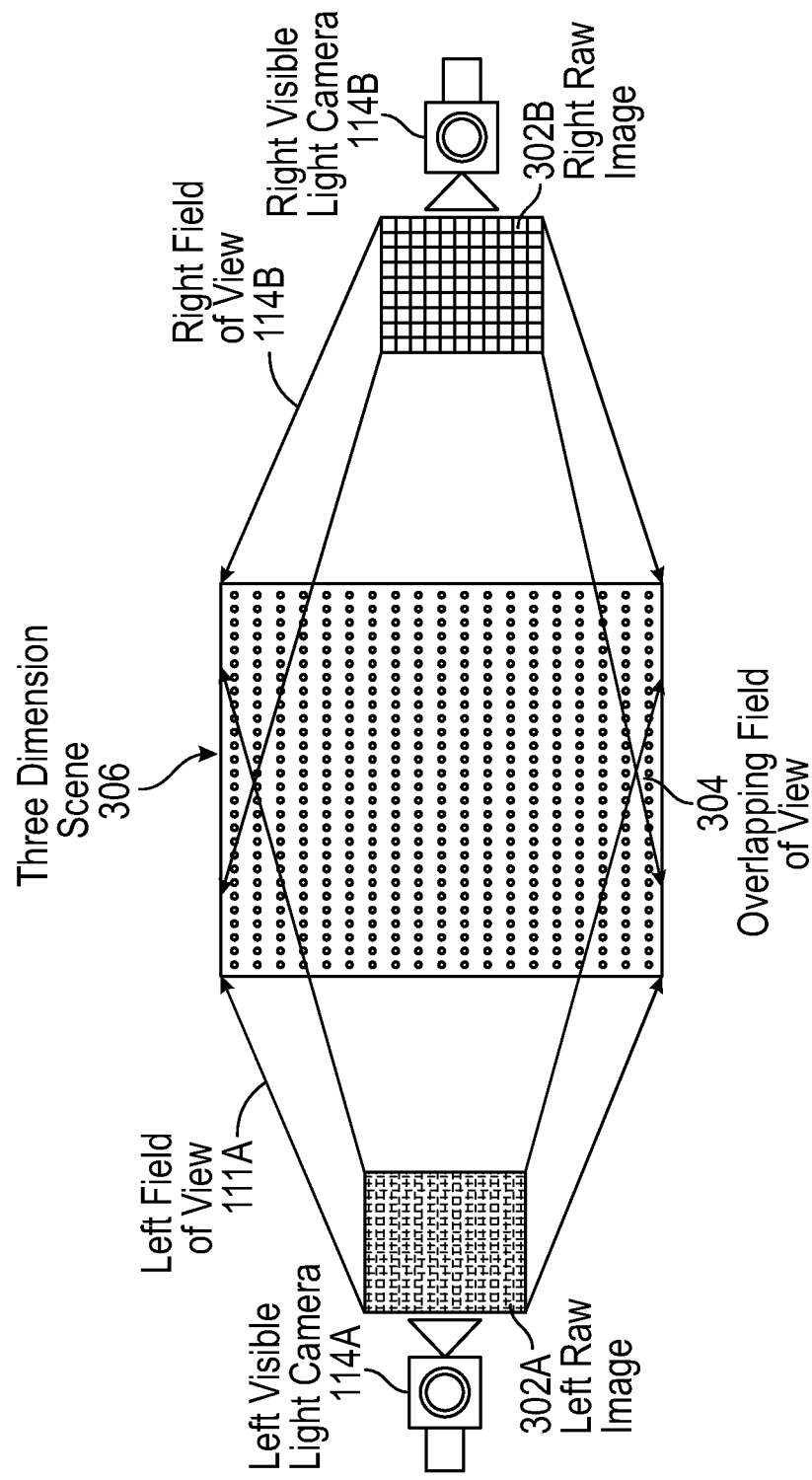
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 110°, for example 24°, and have a resolution of 480×480 pixels or greater. The "angle of coverage" describes the angle range that a lens of visible-light cameras 114A, 114B or infrared camera 410 (see FIG. 4) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); and/or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, and/or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412 or another processor, which controls operation of the visible-light cameras 114A, 114B to act as a stereo camera simulating human binocular vision, may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, and/or a blue pixel light value); a position attribute (e.g., an X location coordinate, a Y location coordinate, and a Z location coordinate); a texture attribute and/or a reflectance attribute. The texture attribute quantifies the perceived texture of the depth image, such as the spatial arrangement of color or intensities in a region of vertices of the depth image.

In one example, the eyewear device 100 includes a frame 105, a left temple 110A extending from a left lateral side 170A of the frame 105, and a right temple 125B extending from a right lateral side 170B of the frame 105. The left camera 114A is connected to the frame 105, the left temple 125B, or the left corner 110A to capture a left raw image 302A from the left side of scene 306. The right camera 114B is connected to the frame 105, the right corner 110A, or the right temple 125B to capture a right raw image 302B from the right side of scene 306.

The left temple 110A has a proximal end adjacent a first side of the frame 105 and a distal end. The right temple 110B has a proximal end adjacent a second side of the frame 105 and a distal end. The left front speaker 191A and left front microphone 192a are positioned adjacent the proximal end of the left temple 110A (e.g., on the left temple 110A, on the first/left side of the frame 105, or on the left corner 110A as illustrated). The right front speaker 191B and right front microphone 192b are positioned adjacent the proximal end of the right temple 110B (e.g., on the right temple 110B, on the second/right side of the frame 105, or on the right corner 110B as illustrated). The left rear speaker 191C and left rear microphone 192c are positioned adjacent the distal end of the left temple 110A (e.g., on the left temple 110A as illustrated). The right rear speaker 191d and right rear microphone 192D are positioned adjacent the distal end of the right temple 110B (e.g., on the right temple 110B as illustrated).

FIG. 1B is a top cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left corner 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

Figure 2A:
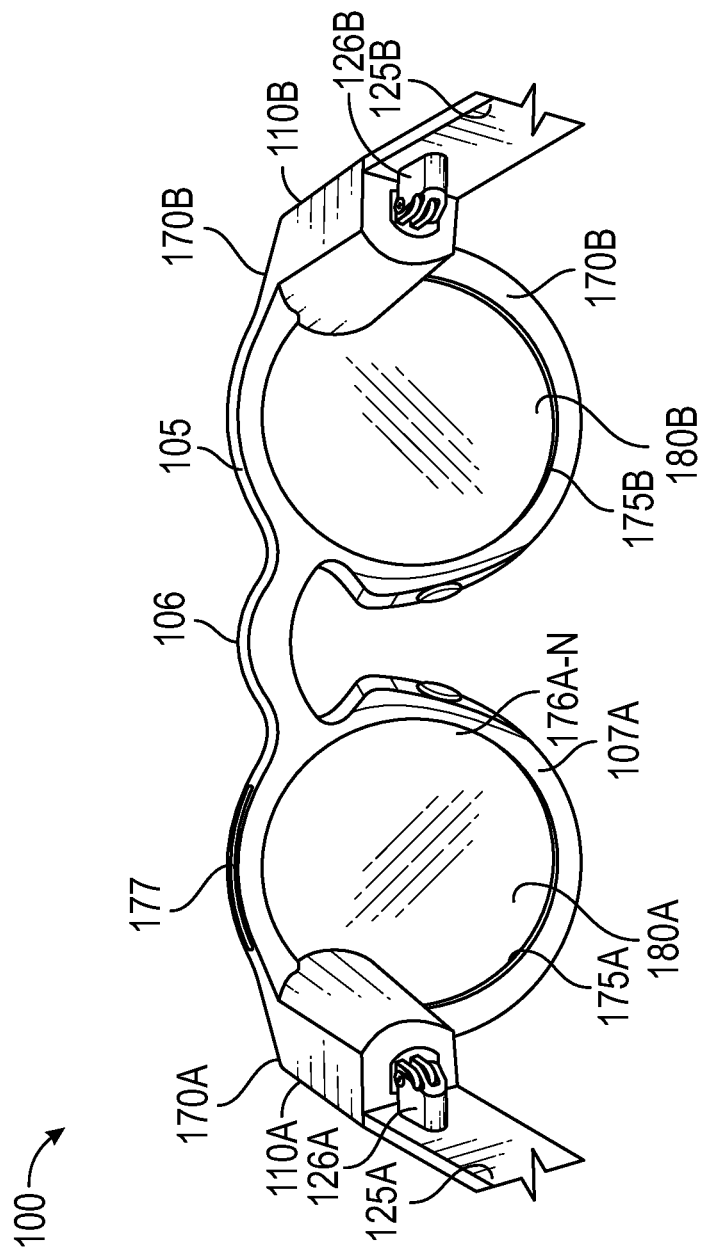
FIGS. 2A and 2B are rear views of example hardware configurations of an eyewear device utilized in an augmented reality system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
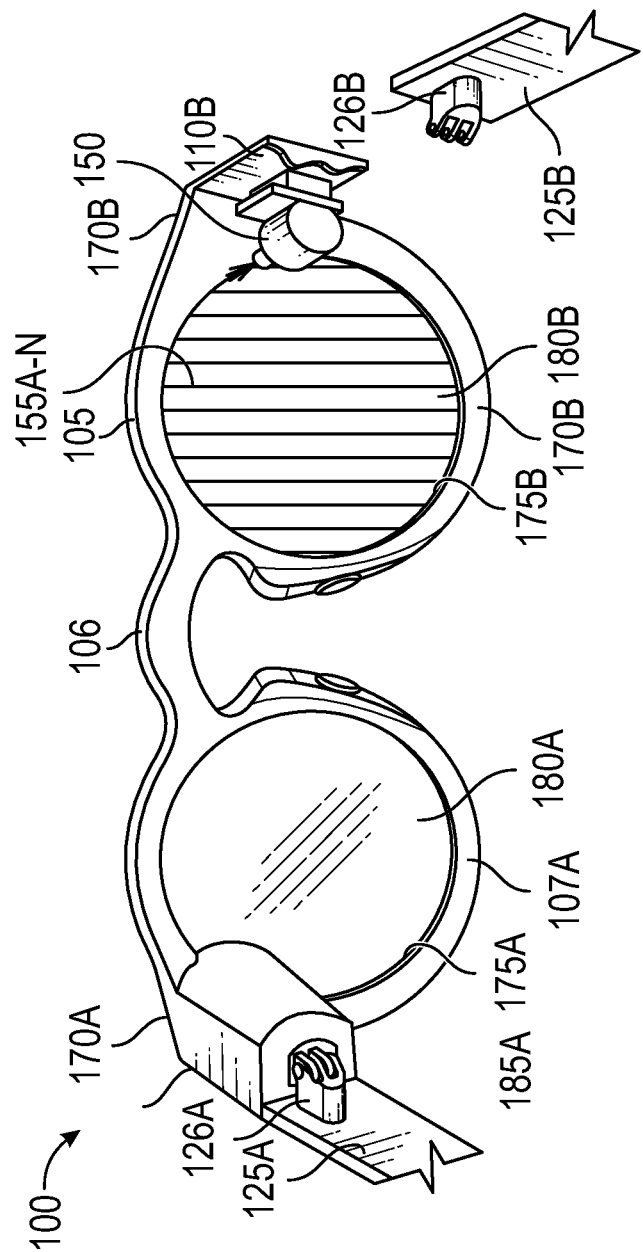

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved and/or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B and/or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) and/or a left set of optical strips 155'A, 155'B, . . . 155'N (155 prime, A through N, not shown) which are configured to interact with light from the left projector 150A. Similarly, the right optical assembly 180B may include a right display matrix 177B (not shown) and/or a right set of optical strips 155"A, 155"B, . . . 155"N (155 double-prime, A through N, not shown) which are configured to interact with light from the right projector 150B. In this example, the eyewear device 100 includes a left display and a right display.

Figure 4:
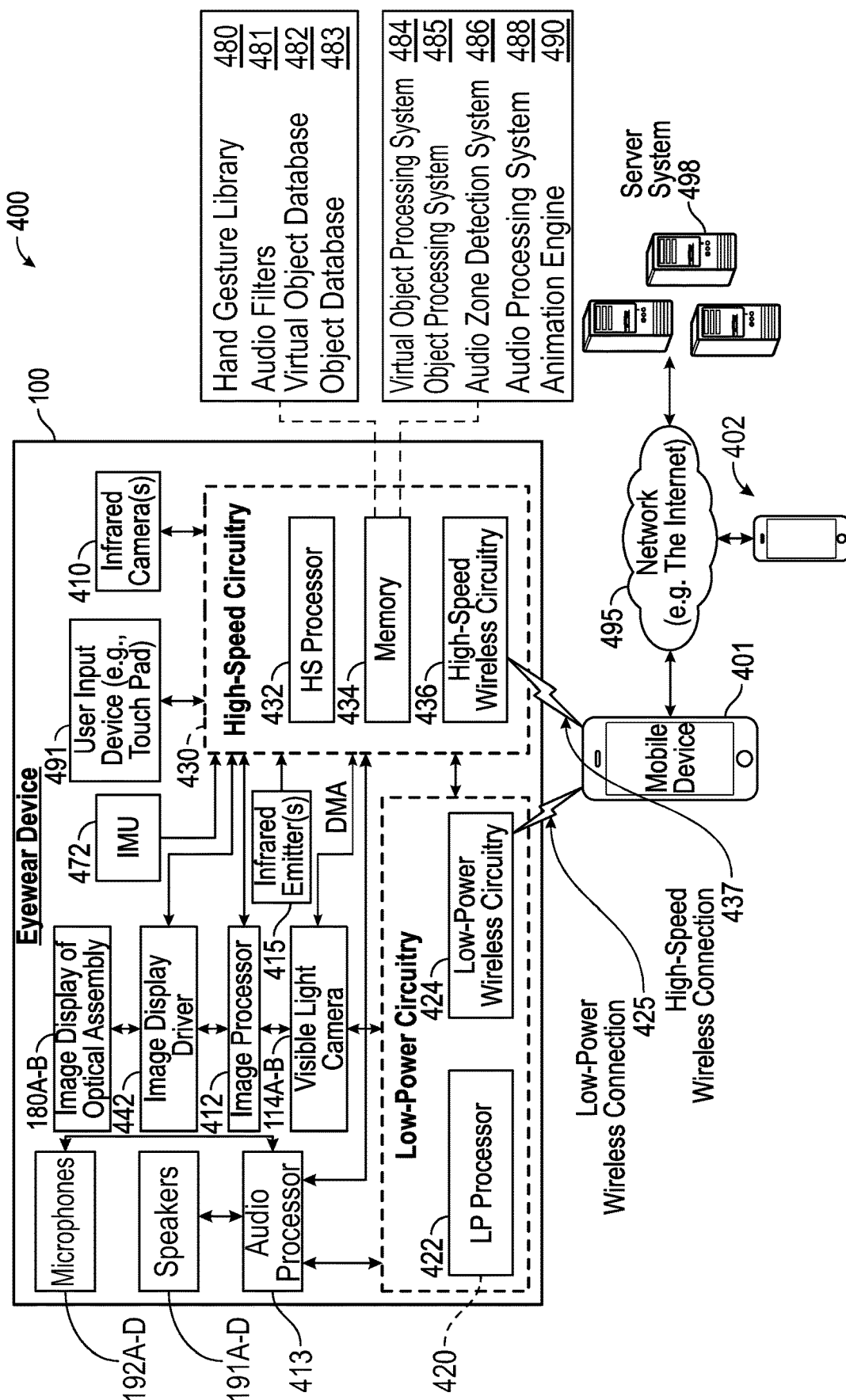
FIG. 4 is a functional block diagram of an example audio enhanced augmented reality system including a wearable device (e.g., an eyewear device), another electronic device, and a server system connected via various networks.

FIG. 4 is a functional block diagram of an example augmented reality system 400 including a wearable device (e.g., an eyewear device 100), another electronic device 402, a mobile device 401, and a server system 498 connected via various networks 495 such as the Internet. The system 400 includes a low-power wireless connection 425 and a high-speed wireless connection 437 between the eyewear device 100 and a mobile device 401—and, in some examples, as shown, between the eyewear device 100 and the other electronic device 402. The augmented reality system 400 additionally includes speakers 191A-D and microphones 192A-D on the eyewear device 100 for presenting and receiving audio information. The speakers 191A-D and microphones 192A-D may be controlled directly via processor 432 or indirectly via one or more audio processors such as audio processor 413.

As shown in FIG. 4, the eyewear device 100 includes one or more visible-light cameras 114A, 114B that capture still images and/or video, as described herein. The cameras 114A, 114B may have a direct memory access (DMA) to high-speed circuitry 430 and function as a stereo camera. The cameras 114A, 114B may be used to capture initial-depth images for rendering three-dimensional (3D) models that are texture-mapped images of a red, green, and blue (RGB) imaged scene. The device 100 may also include a depth sensor, which uses infrared signals to estimate the position of objects relative to the device 100. The depth sensor in some examples includes one or more infrared emitter(s) 415 and infrared camera(s) 410. The cameras and the depth sensor are non-limiting examples of sensors in the eyewear device 100.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images and/or video. The image display driver 442 is coupled to the image displays of each optical assembly 180A, 180B in order to control the display of images.

The components shown in FIG. 4 for the eyewear device 100 are located on one or more circuit boards, for example, a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or WiFi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
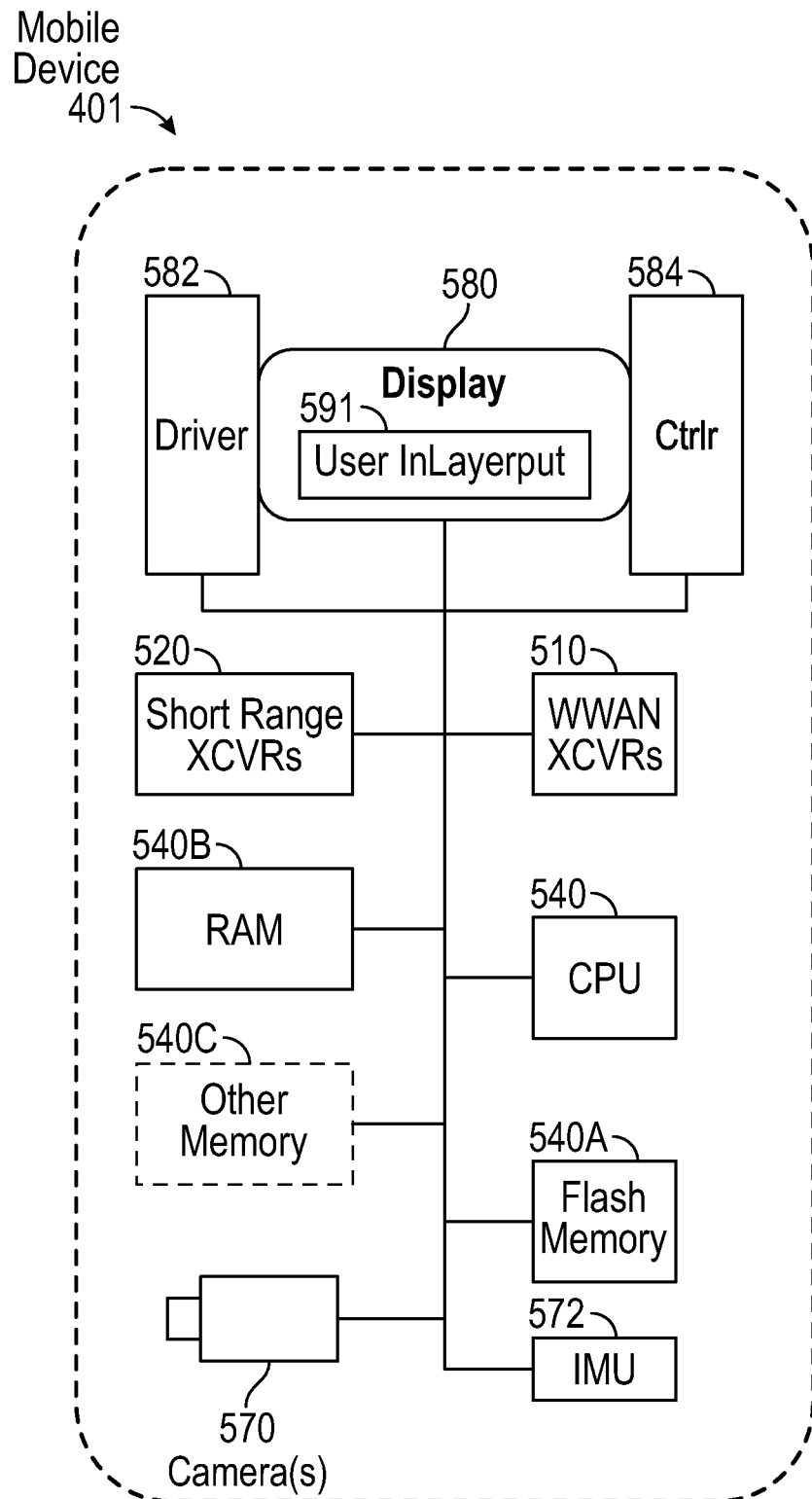
FIG. 5 is a diagrammatic representation of an example hardware configuration for a mobile device of the augmented reality system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide).

The image displays may each have a display area that corresponds to the field of view obtained by the camera(s) 114.

The eyewear device 100 may include a user-facing indicator (e.g., an LED, a loudspeaker, or a vibrating actuator), and/or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), visual input (e.g., hand gestures captured via cameras 114A-B), and audio input components (e.g., a microphone), and the like. The mobile device 401 and the server system 498 may include alphanumeric, pointer-based, tactile, audio, visual, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. Additionally, or alternatively, the position of the eyewear device 100 may be determined by comparing images captured by, for example, cameras 114 and comparing those images to previously captured images having known positional information. Thus, the position of the device 100 may be determined by location sensors, such as image information gathered by cameras 114, a GPS receiver, one or more transceivers to generate relative position coordinates, altitude sensors or barometers, and/or other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The memory 434, in some example implementations, includes a hand gesture library 480. The library of hand gestures 480 includes poses and gestures, with the hand in various positions and orientations. The stored poses and gestures are suitable for comparison to a hand shape that is detected in an image. The library 480 includes three-dimensional coordinates for landmarks of the hand, e.g., from the wrist to the fingertips, for use in matching. For example, a hand gesture record stored in the library 480 may include a hand gesture identifier (e.g., pointing finger, closed fist, open palm, relaxed hand, grasping an object, pinching, spreading), a point of view or a directional reference (e.g., palmar side visible, dorsal, lateral), and other information about orientation, along with three-dimensional coordinates for the wrist, the fifteen interphalangeal joints, the five fingertips and other skeletal or soft-tissue landmarks. The process of detecting a hand shape, in some implementations, involves comparing the pixel-level data in one or more captured frames of video data to the hand gestures stored in the library 480 until a match is found, e.g., by applying a machine vision algorithm. A match may be determined when a predefined confidence threshold set in the machine vision algorithm is exceeded.

The memory 434 additionally includes, in some example implementations, audio filters 481, a virtual object database 482, an object database 483, a virtual object processing system 484, an object processing system 485, an audio zone detection system 486, and an audio procession system 488.

The virtual object database 482 includes information associated with virtual objects. In one example, the virtual object database 482 includes audio information (e.g., an audio track) and visual information (e.g., images for producing appearance).

The object database 483 includes information associated with physical objects. In one example, the object database 483 includes audio information (e.g., audio signals) and visual information (e.g., images) associated with physical objects for use in identifying physical objects in a surrounding environment. The audio information, visual information, or both may be used to train a CNN for use in identifying physical objects in an environment. For example, if the physical object is a dog, the audio information in object database 483 may include audio tracks of various sounds of dogs barking and the visual information in the object database 483 may include images of dogs. These sounds can be used to further train the CNN to identify a particular species of dog.

The virtual object processing system 484 generates instructions for presenting virtual objects on the image display of optical assembly 180A-B and controlling movement of the virtual objects. The virtual object processing system 484 additionally calculates information associated with the virtual object such as its position, directional velocity, and distance with respect to the user.

The object processing system 485 generates instructions for processing audio information, video information, or both to identify a corresponding physical object. In one example, the object processing system 485 applies a CNN classification to the audio information, video information, or both to identify the physical object. The object processing system 485 may train the CNN using the audio information and visual information in the object database 483.

The audio zone detection system 486 generates instructions for detecting which zone the virtual object is currently in with respect to the head of a user. In one example the audio zone detection system 484 maintains a map (see FIG. 6C) representing the zones surrounding a head of a user for use in zone detection.

The audio processing system 488 generates instructions for applying head related transfer function (HRTF) filters to the audio tracks of the virtual objects responsive to their current position and presenting sound to the user via audio processor 413 and speakers 191. In one example, based on the direction of sound of an object, the processor 432 creates a dynamic application object (e.g., an application for creating AR image overlays including a virtual object) and corresponding audio. A HRTF is applied to the corresponding audio as the direction of an object/virtual object changes. Additionally, beam forming algorithms may be applied to incoming audio signals from the microphones 192 and audio processor 412 to determine from which direction or zone the audio signal originated.

The memory 434 may additionally include an image capture application, a localization system, and an image processing system. Where a camera of eyewear device 100 is capturing frames of video data, the image capture application configures the processor 432 to detect a hand shape (e.g., a pointing index finger). The localization system configures the processor 432 to obtain localization data for use in determining the position of the eyewear device 100 relative to the physical environment. The localization data may be derived from a series of images, an IMU 472, a GPS unit, or a combination thereof. The image processing system configures the processor 432 to present a captured still image on a display of an optical assembly 180A-B in cooperation with the image display driver 442 and the image processor 412.

In some examples, the devices 100, 401, 402 illustrated in FIG. 4 are configured to cooperate and share the processing demand when performing any of the functions described herein. For example, the other electronic device 402, may be configured to detect an interaction, such as a wireless signal from the device 100, and process the interaction to determine relative proximity. If within a predefined range, the electronic device 402 sends an application programming interface (API) to the eyewear device 100, at which point the eyewear device 100 takes over the task of performing additional functions. Additional functions may also be performed by the mobile device 401. In this aspect, the augmented reality system 400 distributes, shares, and manages the processing demand such that the functions described herein are performed efficiently and effectively.

The augmented reality system 400, as shown in FIG. 4, includes a computing device, such as mobile device 401, coupled to an eyewear device 100 and another remote electronic device 402 over a network. The augmented reality system 400 includes a memory for storing instructions and a processor for executing the instructions. Execution of the instructions of the augmented reality system 400 by the processor 432 configures the eyewear device 100 to cooperate with the other electronic device 402 and/or the mobile device 401. The system 400 may utilize the memory 434 of the eyewear device 100 and/or the memory elements 540A, 540B, 540C of the mobile device 401 (FIG. 5) and/or the memory 630 of the other electronic device 402. Also, the system 400 may utilize the processor elements 432, 422 of the eyewear device 100 and/or the central processing unit (CPU) 540 of the mobile device 401 (FIG. 5) and/or the microprocessor of the other electronic device 402. In addition, the system 400 may further utilize the memory and processor of the server system 498. In this aspect, the memory and processing functions of the augmented reality system 400 can be shared or distributed across the eyewear device 100, the mobile device 401, the other electronic device 402, and/or the server system 498.

In some examples, a portion of the memory 434 is used to store object database(s) 482/483 while another portion of the memory 434 has programming stored therein, which when executed by the processor 432 provides an object processing system 484/485. In some examples, the object database(s) 482/483 is initially stored in a memory of the server system 498 and the memory 434 includes programming instructions, which when executed by the processor 432 causes the eyewear device 100 to access the server system 498, retrieve all or a portion of the object database(s) 482/483 from the server system 498, and store the retrieved object database(s) 482/483 in the memory 434.

FIG. 5 is a high-level functional block diagram of an example mobile device 401. Mobile device 401 includes a flash memory 540A that stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. The structure and operation of the touchscreen-type devices are provided by way of example and the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or WiFi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include image-based location systems and a global positioning system (GPS) receiver. Alternatively, or additionally, the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 5. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Suitable algorithms include particle filter, Kalman filters, extended Kalman filter, and covariance intersection methods. Algorithms that apply machine learning in SLAM are also within the scope of these teachings. Additionally, the processor 432 may identify an object location (associated with a location, a physical object, or a virtual object) and guide the user of the eyewear device 100 toward the object location using audio signal presented by speakers of the eyewear device 100.

Sensor data includes images received from one or both of the cameras 114A-B, distance received from a laser range finder, position information received from a GPS unit, or a combination of two or more of such sensor or other sensor providing data useful in determining positional information.

Figure 6A:
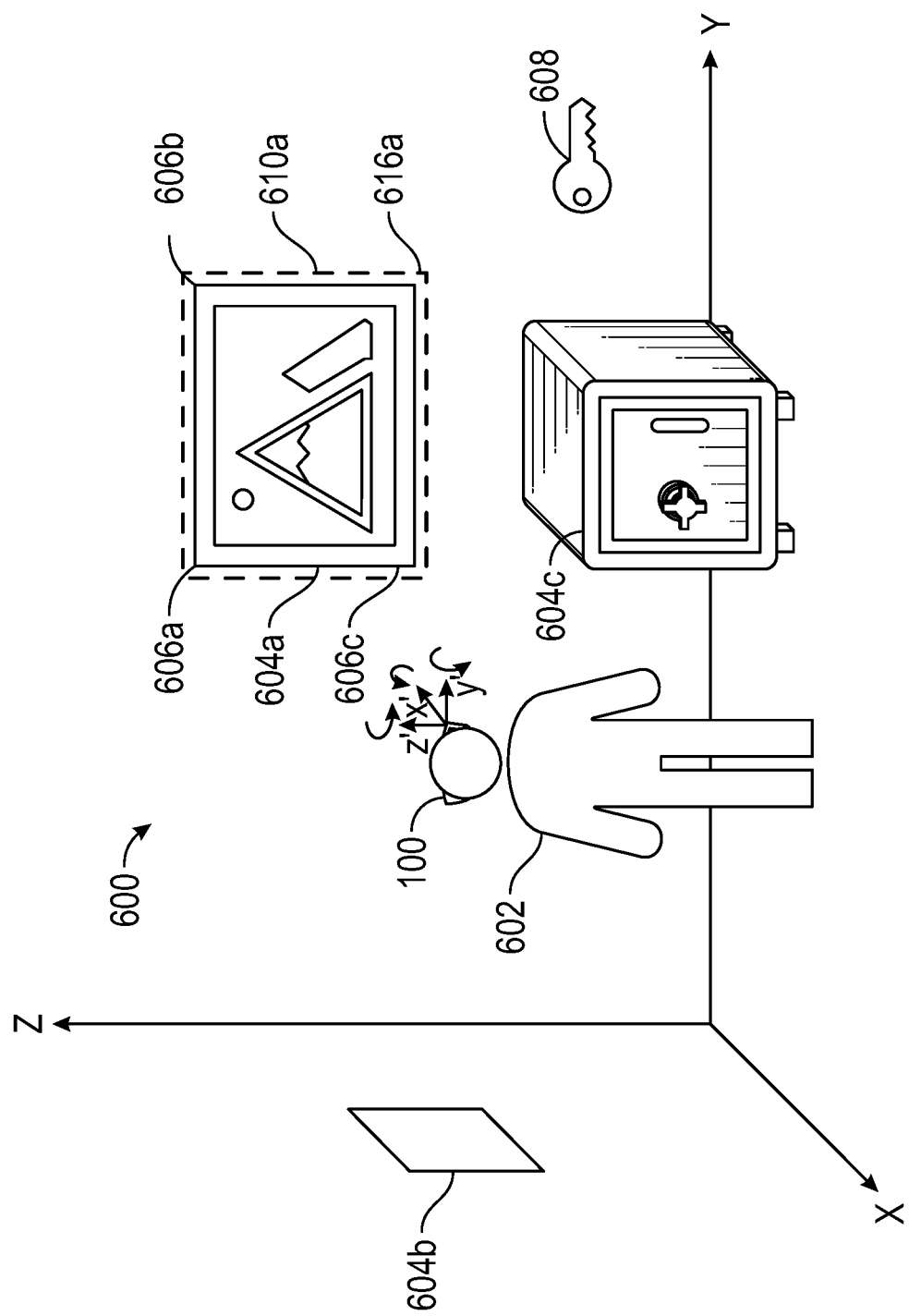
FIGS. 6A and 6B are illustrations for use is describing feature tracking, simultaneous localization and mapping, and spatial audio.

FIG. 6A depicts an example environment 600 from a rear perspective for implementing natural feature tracking (NFT) and SLAM processing. A user 602 of the eyewear device 100 is present in the environment 600 (which is a room in FIG. 6A). The processor 432 of the eyewear device 100 determines its position with respect to one or more physical objects 604 within the environment 600 using captured images, constructs a map of the environment 600 using a coordinate system (x, y, z) for the environment 600, and determines its position within the coordinate system. Additionally, the processor 432 determines a head pose (position, roll, pitch, and yaw) of the eyewear device 100 within the environment by using two or more location points (e.g., three location points 606a, 606b, and 606c) on one or more physical objects 604 or by using one or more location points 606 on two or more physical objects 604. The processor 432 of the eyewear device 100 may position virtual objects (e.g., butterfly 608) within the environment for augmented reality viewing via image displays 180.

Figure 6B:
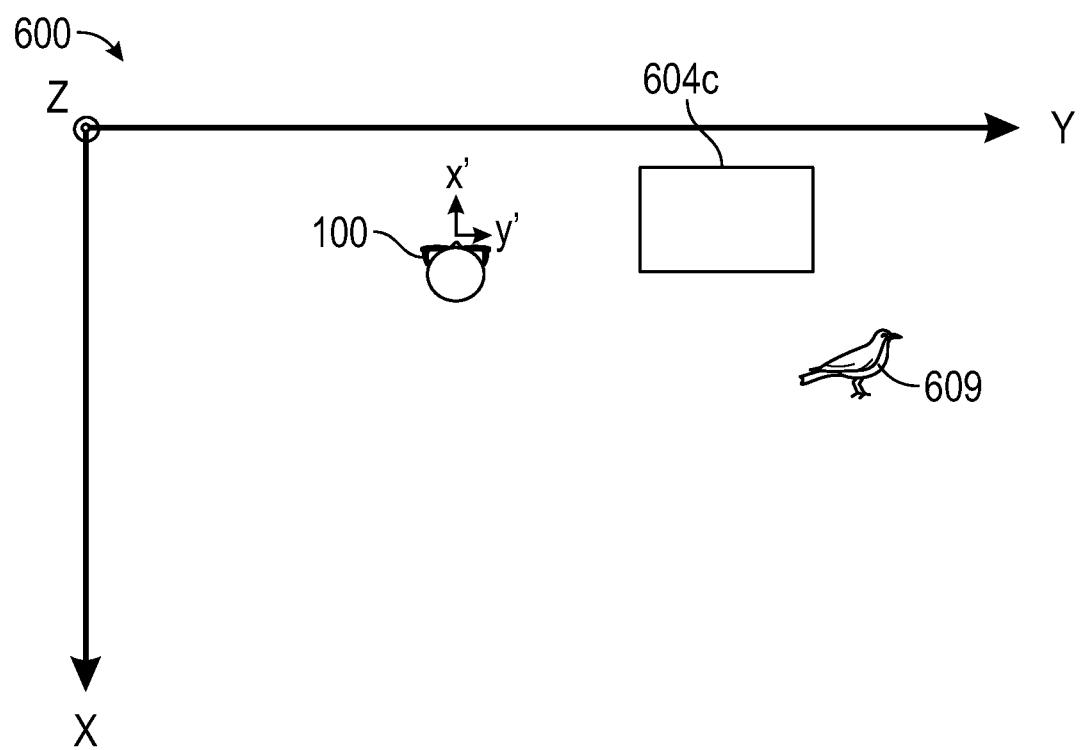

FIG. 6B depicts the example environment 600 from a top perspective with an added physical object (bird 609). As shown in the top perspective, the physical safe 604c is to the front right side of the user wearing the eyewear device 100 and the bird 609 is to the rear right side of the user. Both objects 604c/609 are outside the field of view/display area of the eyewear device 100 when facing substantially along the x-axis. As described below, the eyewear device 100 obtains audio information including audio signals from the bird 609 via microphones 192, which are processed to determine the direction of the bird 609 from the eyewear device 100.

Figure 6C:
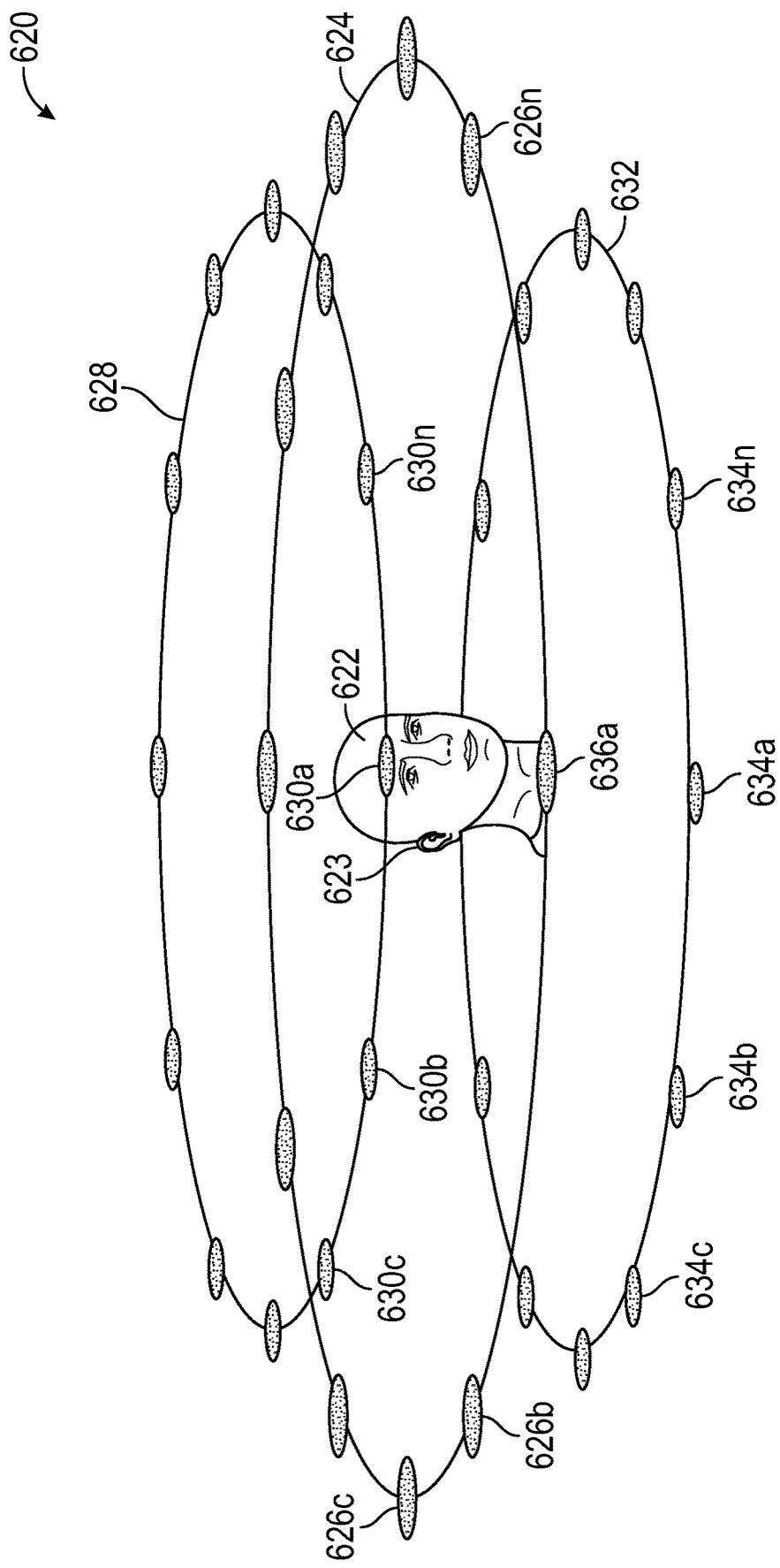
FIG. 6C is an illustration for use in describing directional audio and audio zones.

FIG. 6C is an illustration representing a zone map 620 with objects (36 objects in FIG. 6C) positioned in each of multiple zones surrounding objects (e.g., 36 zones; not illustrated) around a user for use in selecting HRTF filters to apply to audio tracks for presentation at an ear 623 of the user. The zone map defines the boundary of each zone. In an example, the space around the head 622 of the user is defined into 36 zones: 12 sectors rotationally around the head (like a clock), with each sector broken into 3 vertical zones: above ear 628, at ear level 624, and below ear 632. Objects 626a-n are positioned within respective zones around the user at ear level 624, objects 630a-n are positioned within respective zones around the user above ear level 628, objects 634a-n are positioned within respective zones around the user below ear level 812.

FIGS. 7A-7G show flow charts 700, 720, 740, 750, 760, 780, and 790 depicting example methods for implementing an audio enhanced augmented reality experience using an eyewear device. Although the steps are described with reference to the eyewear device 100, as described herein, other implementations of the steps described, for other types of devices, will be understood by one of skill in the art from the description herein. Additionally, it is contemplated that one or more of the steps shown in FIGS. 7A-7G, and described herein, may be omitted, performed simultaneously and/or in a series, performed in an order other than illustrated and described, and/or performed in conjunction with additional steps.

In the example method depicted in flow chart 700, the eyewear device 100 captures information (e.g., images and audio) for an environment surrounding the eyewear device and can identify a physical object within that environment by processing audio signals from the physical object. Once identified, the eyewear device monitors its position with respect to the physical object. Additionally, the eyewear device 100 may generate a virtual object for presentation in the environment.

At block 702, the eyewear device 100 captures information (e.g., images and audio) for the environment 600 surrounding the eyewear device 100. The eyewear device 100 captures images using at least one sensor, for example visible light camera(s) 114. The eyewear device 100 captures audio information within the environment 600 using microphones 192. The processor 432 may continuously receive images and audio information from the visible light camera(s) 114 and microphones 192 and store the images and audio information in memory 434 for processing. Additionally, the eyewear device may capture information from other sensors, e.g., location information from a GPS sensor and/or distance information from a laser distance sensor.

At block 704, the processor 432 of the eyewear device 100 identifies the location of one or more objects 604 within the environment 600 using captured images, audio information, or a combination thereof. The processor 432 may implement object processing systems 484/485 to compare object image data or audio data from the captured images stored in memory 434 to respective object image data or audio data of known objects in the object database(s) 482/483 (FIG. 4), e.g., implementing a conventional object recognition algorithm or a neural network trained to identify objects. In one example, the processor 432 is programmed to identify a predefined particular object (e.g., a particular picture 604a hanging in a known location on a wall, a window 604b in another wall, a heavy object such as a safe 604c positioned on the floor, a dog barking, children laughing, a car horn, etc.). Other sensor data, such as GPS data, may be used to narrow down the number of known objects for use in the comparison (e.g., only objects associated with a room or animals associated with a park that are identified through GPS coordinates). In another example, the processor 432 is programmed to identify predefined general objects (such as one or more trees within a park).

After recognizing an object(s), the eyewear device 100 determines its position with respect to the object(s) (i.e., location and optionally orientation). The eyewear device 100 may determine its position with respect to the objects. In one example, the eyewear device 100 determines position based solely on audio information received by the microphones 192, e.g., by applying time of flight/beam forming algorithms to audio signals within the audio information. In other examples, image information is used in addition to or instead of the audio information to determine direction, e.g., by comparing and processing distances between two or more points in the captured images (e.g., between two or more location points on one objects 604 or between a location point 606 on each of two objects 604) to known distances between corresponding points in the identified objects. Distances between the points of the captured images that are greater than the points of the identified objects indicate the eyewear device 100 is closer to the identified object than the imager that captured the image including the identified object. On the other hand, distances between the points of the captured images that are less than the points of the identified objects indicate the eyewear device 100 is further from the identified object than the imager that captured the image including the identified object. By processing the relative distances, the processor 432 is able to determine the position (i.e., location and orientation) within respect to the objects(s). Alternatively, or additionally, other sensor information, such as laser distance sensor information, may be used to determine position with respect to the object(s). For location, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and periodically determines its location within that coordinate system with respect to the identified objects. In another example, the eyewear device constructs a map using images of permanent or semi-permanent objects 604 within an environment (e.g., a tree or a park bench within a park). In accordance with this example, the eyewear device 100 may define the coordinate system (x', y', z') used for the environment. The eyewear device 100 may periodically determine its location through NFT and SLAM processing. Additionally, or alternatively, other techniques may be used to determine location such as GPS signals received by a GPS receiver. For orientation, the eyewear device 100 determines a head pose (roll, pitch, and yaw) of the eyewear device 100 within the environment, e.g., also through SLAM processing. The processor 432 may determine head pose by using two or more location points (e.g., three location points 606a, 606b, and 606c) on one or more objects 604 or by using one or more location points 606 on two or more objects 604. Using conventional image processing algorithms, the processor 432 determines roll, pitch, and yaw by comparing the angle and length of lines extending between the location points for the for the captured images and the known images. The eyewear device 100 may periodically determine its orientation through NFT and SLAM processing. Additionally, or alternatively, other technique may be used to determine orientation such as through signals received from IMU 472.

At block 706, associate an object (physical, virtual, or both) with the object location and, optionally, determine when the object location is within the device's field of view/display area. The processor 432 may determine when the object location is within the field of view of the eyewear device 100 by comparing the angular position to a range associated with the device's field of view, e.g., −15 degrees to +15 degrees. When the object location is within the field of view of the eyewear device 100, the processor 432 may present an image overlay including a virtual object via a display of the eyewear device 100 using the image processor 412 and the image display driver 442 of the eyewear device 100. The processor develops and presents the visual images via the image displays responsive to the location of the eyewear device 100 within the environment 600. As the eyewear device 100 moves through the environment, the processor 432 updates the image overlay on the optical assemblies 180 such that the virtual object appears at the object location while the object location is within the field of view. In one example, when the object location moves out of the field of view, the virtual object is no longer presented. In another example, when the object location moves out of the field of view that virtual object may be presented at the edge of the field of view in a position on the perimeter of the field of view that is nearest the object locations. The presented virtual object has a virtual position in three-dimensional space, which the virtual object process system 484 tracks in relation to the location of the identified object. In one example, the virtual position in three-dimensional space is substantially perceived by the user to be associated with an x-y plane appearing to lie on a surface (e.g., the ground, floor, countertop, etc.). In one example, the visual images include an image of a hand 1002 for manipulating features of a GUI (FIG. 10) or interacting with a virtual object such as a virtual bird 906a (FIG. 10) or displayed information associated with the object (e.g., a listing a characteristics and features).

In one example, movement of the hand 1002 is controlled based on movement of a real hand 1000 in a field of view of the eyewear device 100. Movement of the real hand 1000 is detected by comparing features of the hand in images captured by cameras of the eyewear device 100 to features in a hand gesture library 480 to identify a match. Once a match is identified, the processor 432 of the eyewear device 100 monitors motion of the real hand 1000 in successive images and applies the monitored motion to the virtual hand 1002.

At block 708, processor 432 monitors the position of the eyewear device 100 with respect to the location of the object in response to image information, audio information, or a combination thereof. The device determines a current position (direction and optionally distance) of the object with respect to the head of the user. The current position includes a direction with respect to the head of the user. The current position may additionally include a distance with respect to the head of the user. In one example, the direction and distance are represented by a vector the object processing system 485 calculates that intersects a position associated with the head of the user and the position of the object tracked by the object processing system 485.

The processor 432 may monitor the orientation of the eyewear device 100 as described above for determining orientation as a part of determining position and compare the current orientation to the object location using a geometric algorithm to obtain an angular position. The angular position represents a relative position of the eyewear device 100 to the object location and is associated with a direction, e.g., the object location is to the right of the eyewear device (e.g., angular position of 67.5 degree to 112.5 degrees; directional audio zone 1), to the right and back of the eyewear device 100 (e.g., angular position of 112.5 degrees to 167.5 degrees; directional audio zone 2), or behind the eyewear device 100 (e.g., angular position of 167.5 degrees to 102.5 degrees; directional audio zone 3). The processor 432 stores the directional audio zones for the angular ranges in memory 434, e.g., in a lookup table.

In some examples, the eyewear device 100 is operatively connected, for example, by wireless connection 425, 437 via mobile device 401 and network 495, to server system 498, and the monitored position or the virtual position, the virtual object, or a combination thereof, are stored in another memory in the server system for retrieval by one or more other users. In another example, the location of the virtual object may be shared via wireless connection 425, 437 of eyewear device 100, such as via short-range transceivers (Bluetooth™ or Bluetooth Low-Energy (BLE)) or wireless wide, local, or wide-area network transceivers (e.g., cellular or WiFi) between eyewear devices 100 worn by other users.

At block 710, the eyewear device 100 presents audio and video signals in response to its position in the environment. The processor 432 presents the audio signals selectively through speakers 191 of the eyewear device 100 based on the current orientation of the eyewear device 100 with respect to the object location. Additionally, the processor 432 may present video signals on image display optical assemblies 180 via image display driver 442. In one example, the processor 432 determines a current orientation of the eyewear device 100. The current orientation may be represented as an angular position. The processor 432 selects one of the directional audio zones, e.g., by comparing the angular position to angular ranges associated with each of the directional audio zones and selecting the directional audio zone associated with a range containing the angular position. For example, if the angular position is 90 degrees (indicating the object location is to the right of the eyewear device 100), the processor 432 will select audio zone 1. The processor 432 presents the audio signal by selectively presenting the audio signal via the speakers 191 responsive to the orientation. For example, if directional audio zone 1 is selected due to an angular position of 90 degrees, the processor 432 emits the audio signal via both speakers on the right side of the eyewear device 100.

Additionally, the processor 432 or audio processor 413 may adjust the volume of the audio signal responsive to the relative location between the current location of the eyewear device 100 and the virtual object location. For example, if the object location is relatively far away, e.g., 20 feet, the volume may be reduced such that it is very low or inaudible. As the eyewear device 100 moves closer to the virtual object location, the processor 432 increases the volume, thereby providing an indication to the user that they are getting closer to the object location. As the eyewear device 100 moves away from the object location, the processor 432 decreases the volume, thereby providing an indication to the user that they are moving away from the object location. In one example, the decibel level or volume of the audio signals increases exponentially as the monitored position of the eyewear device approaches the object. In another example, the decibel level of the audio signals decreases logarithmically as the monitored position of the eyewear device moves away from the virtual object.

The steps described above with reference to blocks 702-710 are repeated to update the position of the eyewear device 100 and adjust the presentation of the audio signal and virtual objects as the eyewear device 100 moves through the environment 600.

Figure 7A:
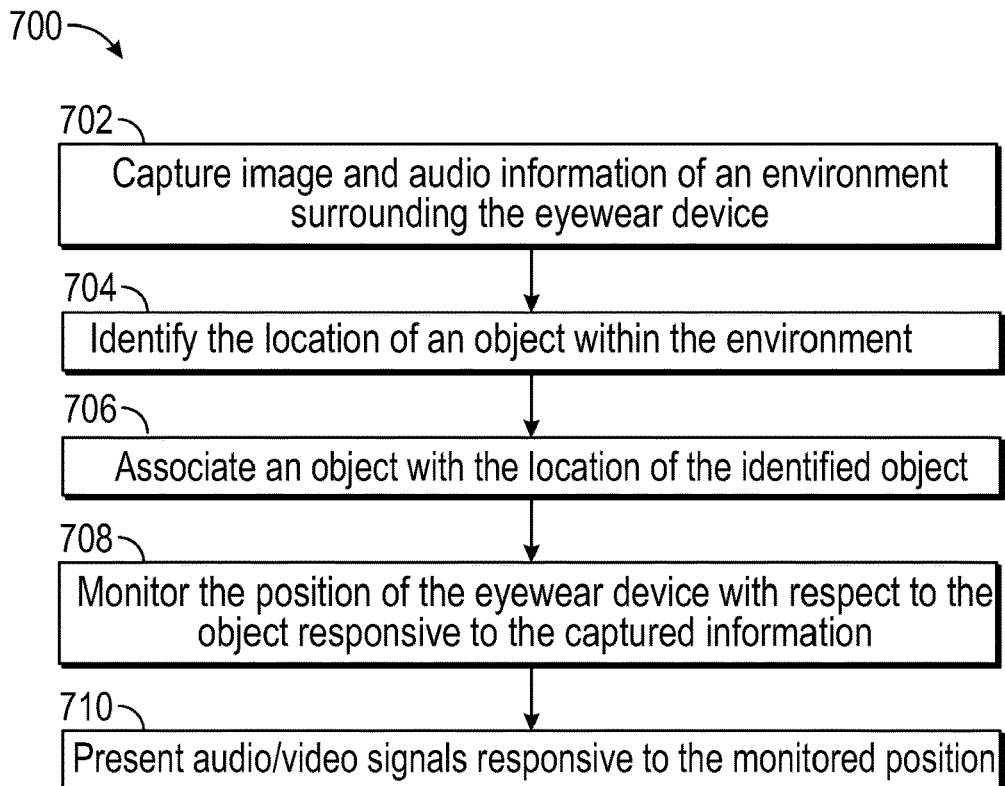
FIGS. 7A, 7B, 7C, 7D, 7E, 7F, and 7G are flowcharts of an example method for providing audio enhanced augmented reality with an eyewear device.
Figure 7B:
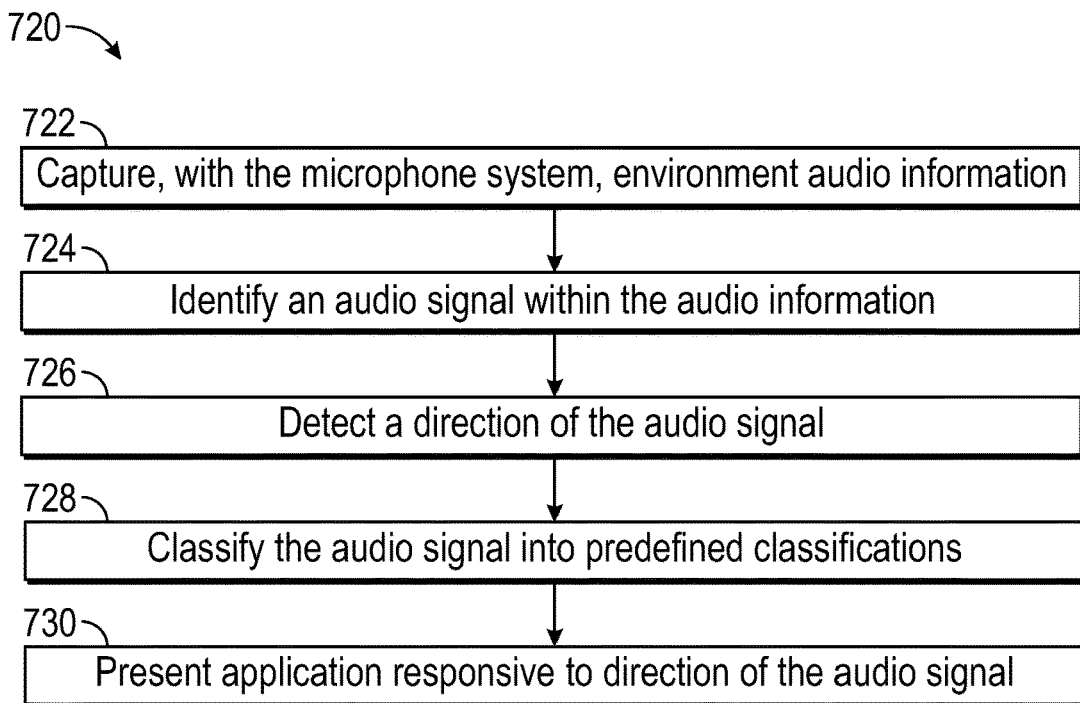

In the example method depicted in flow chart 720 of FIG. 7B, the eyewear device 100 presents applications that are responsive to the direction from which an audio signal is received by the eyewear device. At block 722, the eyewear device 100 captures audio information. In an example, the eyewear device 100 captures audio information with a microphone system including microphones 192a-d and audio processor 413. The audio information includes audio signals from objects in the environment (e.g., animals, kids, waterfalls, emergency vehicles, etc.).

At block 724, the eyewear device 100 identifies an audio signal within the audio information. In an example, the audio processor 413 of the eyewear device 100 applies an audio signal discrimination filter to the audio information picked up by the microphones in the environment to separate out audio signals from respective objects.

At block 726, the eyewear device 100 detects a direction of each audio signal with respect to the eyewear device 100. In an example, the audio processor 413 of the eyewear device applies time of flight and beam forming algorithms to each of the audio signals from respective objects to detect the direction from which the respective audio signal originates.

At block 728, the eyewear device 100 classifies the audio signal into predefined classifications. In an example, the audio processor 413 of the eyewear device applies a CNN to the audio signals to identify known objects (e.g., objects in object database 483). Where multiple known objects are identified, the eyewear device ranks the objects (e.g., based on proximity or a predefined order stored in memory).

At block 730, the eyewear device present an application on a presentation system. In an example, the presentation system includes an image presentation system, an audio presentation system, or both. The image presentation system may include image processor 412, image display driver 442, and image display of optical assembly 180A-B. The audio presentation system may include audio processor 413 and speakers 191A-D.

The presentation system presents the application associated with the classification of the audio signals (block 728). For example, if the classification is associated with dogs barking, the application may be an application related to dogs (e.g., an overlay for presentation on optical assemblies 180A-B). In another example, if the classification is associated with waterfalls, the application may be an application related to waterfalls (e.g., an overlay that includes a waterfall for presentation on optical assemblies 180A-B and an audio enhancement that amplifies the audio signal from the waterfall for presentation via speakers 191a-d).

The presentation system, in some examples, additionally presents the application responsive to the direction from which the audio signal originates. Based on the direction, an application overlay may be adjusted such that it is presented on the optical assemblies 180A-B in a location corresponding to the direction from which the audio signal originates. In one example, where the direction is within the field of view of optical assemblies 180A-B, the overlay is presented in the direction from which the audio signal originates. In another example, where the direction is outside the field of view of optical assemblies 180A-B, the overlay is presented adjacent the perimeter of the optical assemblies 180A-B that is nearest the direction from which the audio signal originates. Similarly, the presentation system may present other audio signals using the audio processor 413 and speakers 191A-D such that these other signals appear to originate from the direction from which the audio signal originates.

Figure 7C:
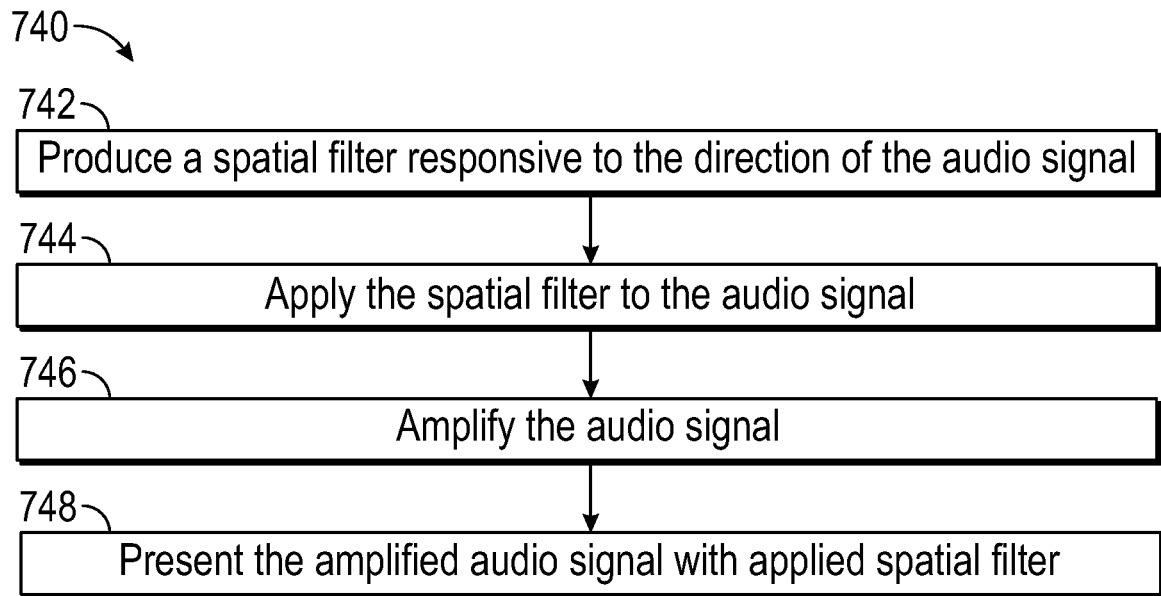

In the example method depicted in flow chart 740 of FIG. 7C, the eyewear device 100 presents an application including an amplified audio signal. This method may be applied when detecting faint audio signals corresponding to objects a user is interested in (e.g., based on the environment or predefined preferences). For example, if the user is in a national park known for its waterfalls (e.g., detected based on GPS location), distant waterfalls may be detected and the audio from the distant waterfalls may be amplified so the user can better experience the waterfall. Similarly, audio signals from emergency vehicle objects may be amplified to make the user more aware of potential danger in the environment.

At block 742, the eyewear device 100 produces a spatial filter responsive to the direction of the audio signal. In an example, the audio processor 413 of the eyewear device selects or generates the spatial filter responsive to time of flight and beamforming algorithms detecting the direction of an incoming audio signal from the microphones 192a-d.

At block 744, the eyewear device 100 applies the spatial filter to the audio signal. In an example, the audio processor 413 applies the produced spatial filter to the audio signal so that the sound presented to the user appears to originate from the direction of the object.

At block 746, the eyewear device 100 amplifies the audio signal. In an example, the audio processor 413 amplifies the audio signal by adjusting the amplitude of the audio signal.

At block 748, the eyewear device presents the amplified audio signal with the applied spatial filter. In an example, the audio processor 413 presents the amplified audio signal with applied spatial filter via speakers 191A-D.

Figure 7D:
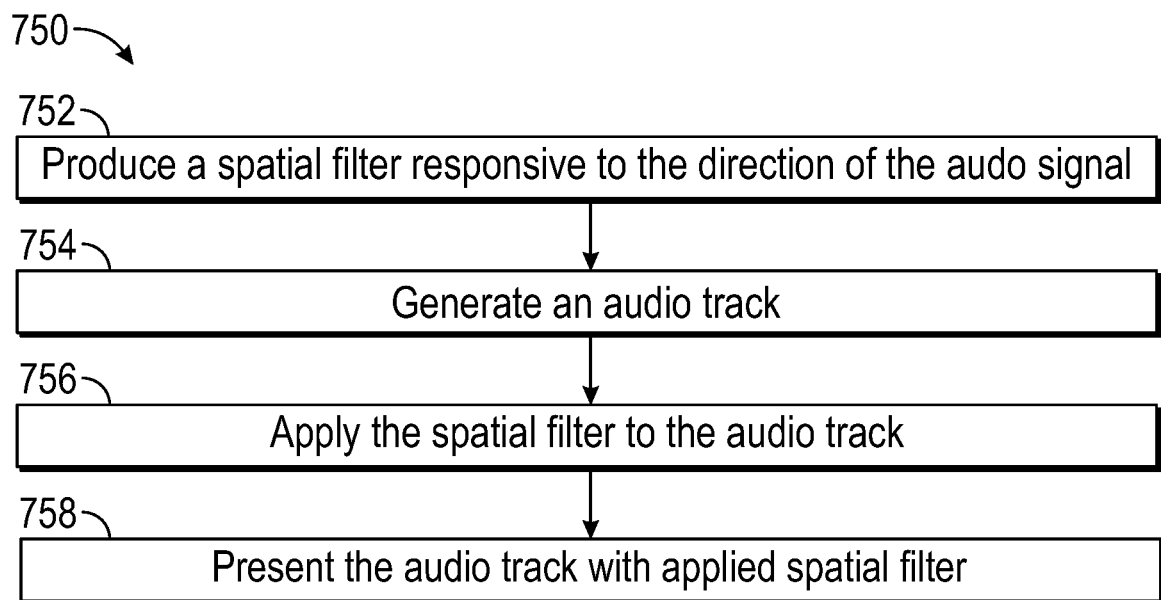

In the example method depicted in flow chart 750 of FIG. 7D, the eyewear device 100 presents an audio track with applied spatial filter. This method may be applied when detecting audio signals corresponding to objects a user is interested in (e.g., based on the environment or predefined preferences). For example, if the user is in a zoo (e.g., detected based on GPS location), sounds of a particular animal may be detected and an information audio track related to that animal may be presented to the user. Similarly, audio signals from a particular emergency vehicle object may be detected and an audio track with information about that vehicle may be presented (e.g., "An ambulance is off to your right") to make the user more aware of potential danger in the environment.

At block 752, the eyewear device 100 produces a spatial filter responsive to the direction of the audio signal. In an example, the audio processor 413 of the eyewear device selects or generates the spatial filter responsive to time of flight and beamforming algorithms detecting the direction of an incoming audio signal from the microphones 192a-d.

At block 754, the eyewear device 100 generates an audio track. In one example, the processor 432 generates the audio track by selecting prerecorded messages stored in memory 434. In another example, the processor 432 generates the audio track by converting stored text to speech for presentation to the user.

At block 756, the eyewear device 100 applies the spatial filter to the audio track. In an example, the audio processor 413 applies the produced spatial filter to the audio track so that the sound presented to the user appears to originate from the direction of the object.

At block 758, the eyewear device presents the audio track with the applied spatial filter. In an example, the audio processor 413 presents the audio track with applied spatial filter via speakers 191A-D.

Figure 7E:
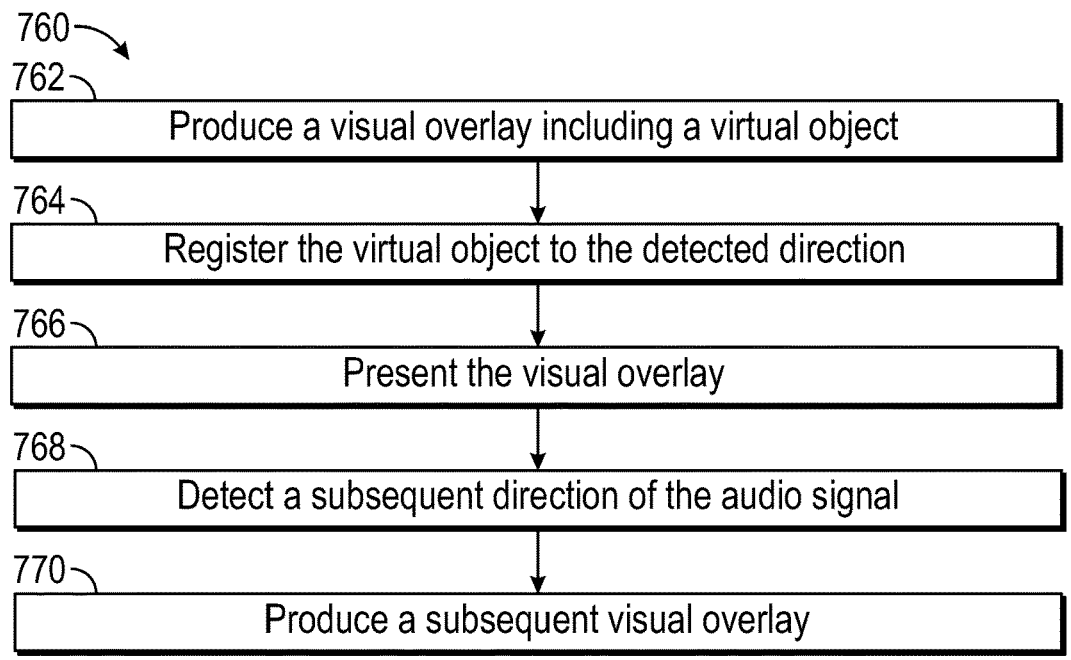

In the example method depicted in flow chart 760 of FIG. 7E, the eyewear device 100 modifies the position of visual overlays as the direction of an incoming audio signal changes. This allows the presented overlay to change position to provide a more immersive experience and, optionally, to guide the user toward an object that can be heard, but not seen.

At block 762, the eyewear device 100 produces a visual overlay including a virtual object. In an example, image processor 412 and virtual object processing system 484 produce a visual overlay including a virtual object retrieved from the virtual object database 482 responsive to the classification of the object.

At block 764, the eyewear device 100 registers the virtual object to the detected direction. In an example, image processor 412 registers the virtual object to the detected direction of the object.

At block 766, the eyewear device 100 presents the visual overlay. In an example, the image processor 412 presents the visual overlay on the image display of optical assemblies 180A-B via image display driver 442.

At block 768, the eyewear device 100 detects a subsequent direction of the audio signal. In an example, the audio processor 413 of the eyewear device 100 periodically applies a beam forming algorithm to the audio signal from the respective object to detect changes in the direction from which the respective audio signal originates.

At block 770, the eyewear device 100 produces a subsequent visual overlay. In an example, the image processor 412 updates the visual overlay by producing a new visual overlay as described above with reference to block 762 using the subsequent direction of the audio signal. This allows the user to visually track the object based on the audio signals produced by the object.

Figure 7F:
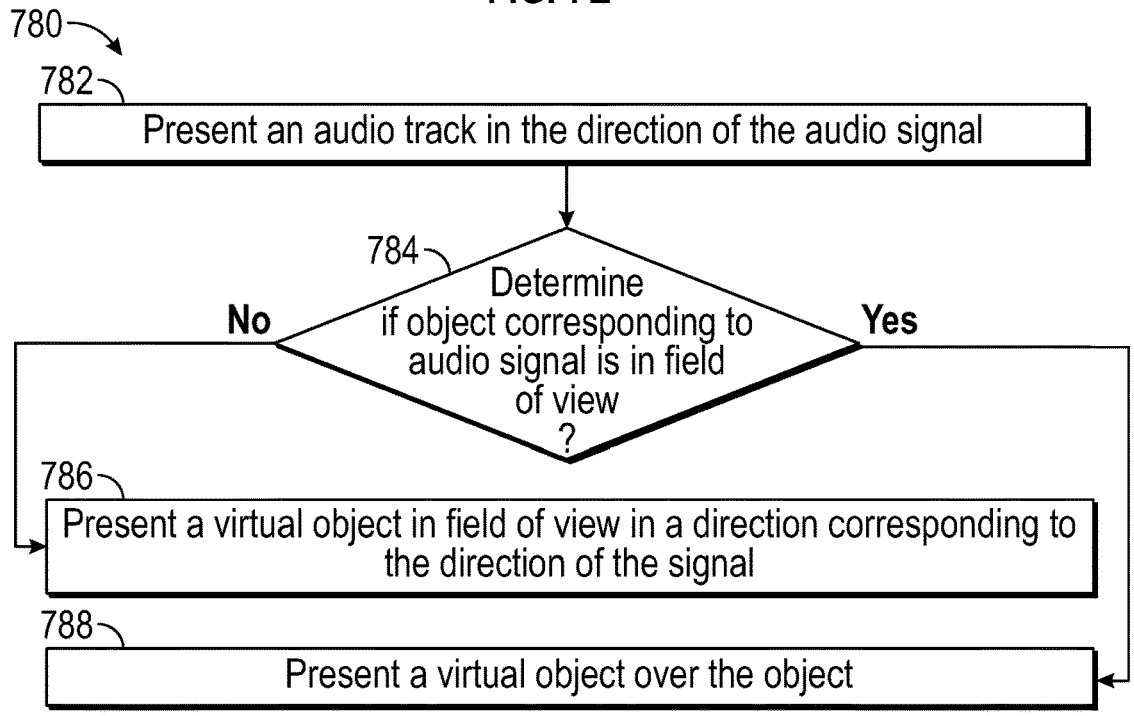

In the example method depicted in flow chart 780 of FIG. 7F, the eyewear device 100 presents virtual object based on whether the object is within the field of view of cameras of the eyewear device 100. This provides an immersive audio experience that is refined responsive to visual information from an object.

At block 782, the eyewear device 100 presents an amplified or generated audio signal or audio track in the direction of the audio signal. In an example, the audio processor 413 presents the amplified or generated audio signal or audio track via the speakers 191A-D such that they appears to originate from an object producing the audio signals.

At decision block 784, the eyewear device 100 determines if an object corresponding to an audio signal is in the field of view of the eyewear device. In an example, the eyewear device 100 determines if the object is within the field of view by comparing the object based on the classification of the audio signal to objects detected in images gathered by visible light cameras 114A-B. The eyewear device 100 additionally compares the direction of the audio signal to the position of object in the images. If there is an object match and a direction/position match, the object is determined to be within the field of view. If the object is not within the field of view, processing proceeds at block 786. Otherwise, if the object is within the field of view, processing proceeds at block 788.

At block 786, the eyewear device 100 presents a virtual object in the field of view in a direction corresponding to the direction of the audio signal. In an example, the image processor 412 under control of the virtual object processing system 484 presents the virtual object a position on the image display of optical assemblies 180A-B corresponding to the direction of the audio signal.

At block 788, the eyewear device 100 presents a virtual object over the object. In an example, the image processor 412 under control of the virtual object processing system 484 and the object processing system 485 presents the virtual object a position on the image display of optical assemblies 180A-B on or adjacent the object.

Figure 7G:
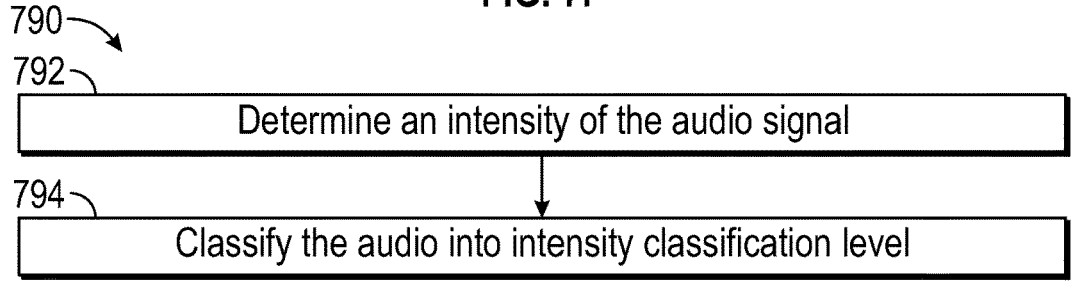

In the example method depicted in flow chart 790 of FIG. 7G, the eyewear device 100 determines a distance to an object based on the intensity of the audio signal from the object. At block 792, the eyewear device 100 determines an intensity of the audio signal. The eyewear device 100 may determine intensity based on a decibel reading output by the audio processor 413. At block 794, the eyewear device 100 classifies the audio signal into an intensity classification level. In one example, the eyewear device 100 classifies the audio signal by comparing the decibel reading to predefined threshold values. Generally, higher decibel levels are associated with closer proximity and lower decibel levels are associated with more distant objects.

FIGS. 6A, 6B, 8A, 8B, and 8C are images for use in describing one example. In the example shown in FIGS. 6A, 6B, 8A, 8B, and 8C, a user 602 wearing an eyewear device 100 enters an environment (e.g., a room in the illustrated example). The eyewear device 100 captures images within the environment. The eyewear device 100 identifies objects/features within the images such as a picture 604a and a window 604b. Additionally, the eyewear device 100 identifies another object within the room (bird 609) based on audio signals from the object. Using NFT and SLAM processing, the eyewear device 100 determines its position (location/orientation) within the environment with respect to the object/features. The eyewear device 100 additionally determines the direction of the bird 609 with respect to the eyewear device 100. Eyewear device 100 launches an application for displaying content on the eyewear device responsive to the identified object. In one example, the application is a graphical application than presents a virtual bird on the display that corresponds to the identified bird that is not in the field of view.

Figure 8A:
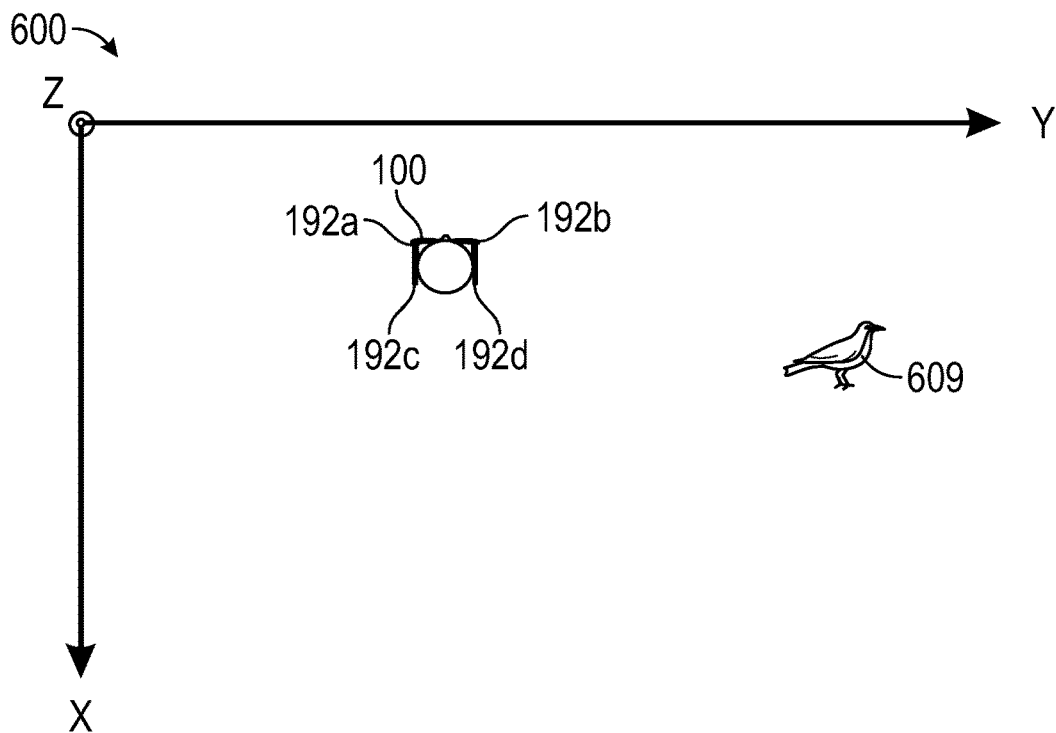
FIGS. 8A, 8B, and 8C are illustrations depicting an example use of the eyewear device.
Figure 8B:
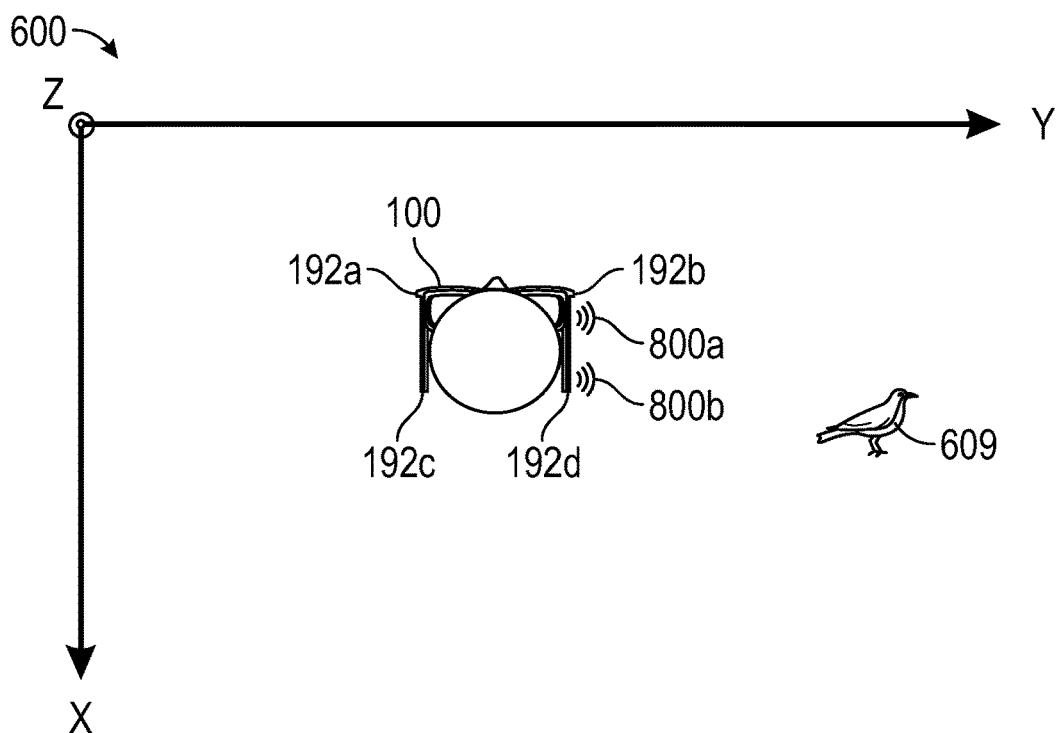

In FIG. 8B, the object location is directly to the right of the eyewear device 100. The eyewear device 100 determines the angular position of the eyewear device 100 with respect to the virtual object location by applying a beam forming algorithm. The eyewear device 100 may update the displayed content, e.g., by moving the virtual bird to another portion of the display.

Figure 8C:
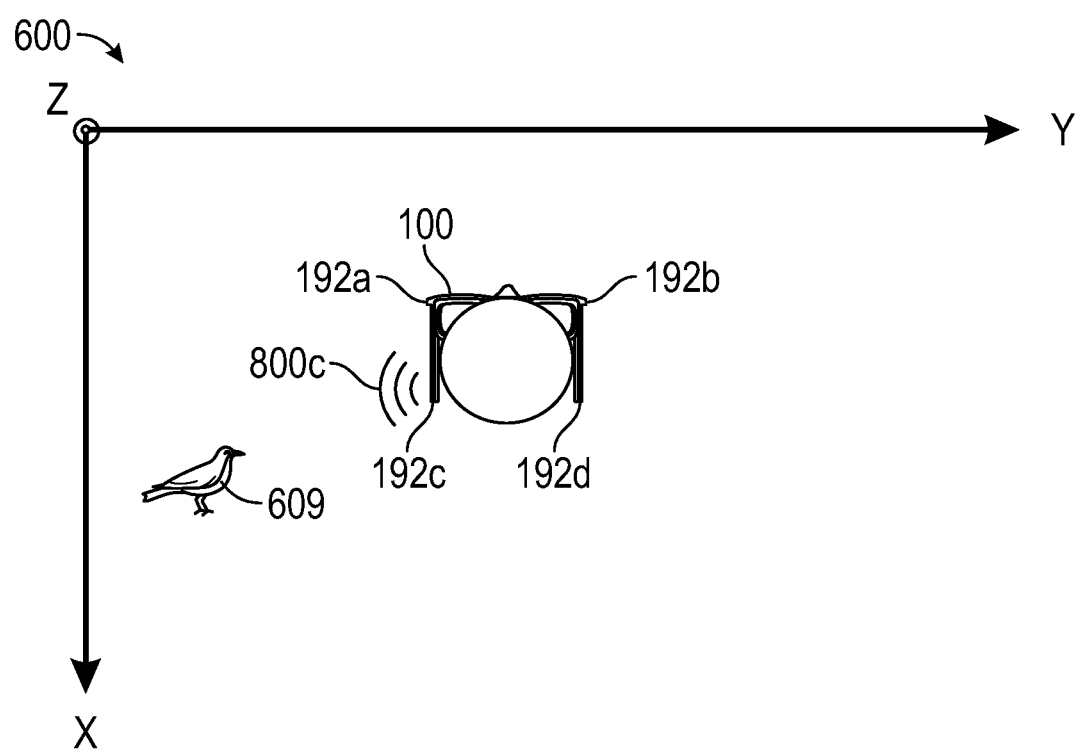

In FIG. 8C, the object location is to the rear and left of the eyewear device 100. The eyewear device 100 determines the angular position of the eyewear device 100 with respect to the virtual object location. Additionally, because the object location in FIG. 8C is closer to the eyewear device 100 than in FIG. 8B, the volume of audio signal 800c may be louder to indicate that the eyewear device 100 is now closer to the virtual object location.

Figure 9A:
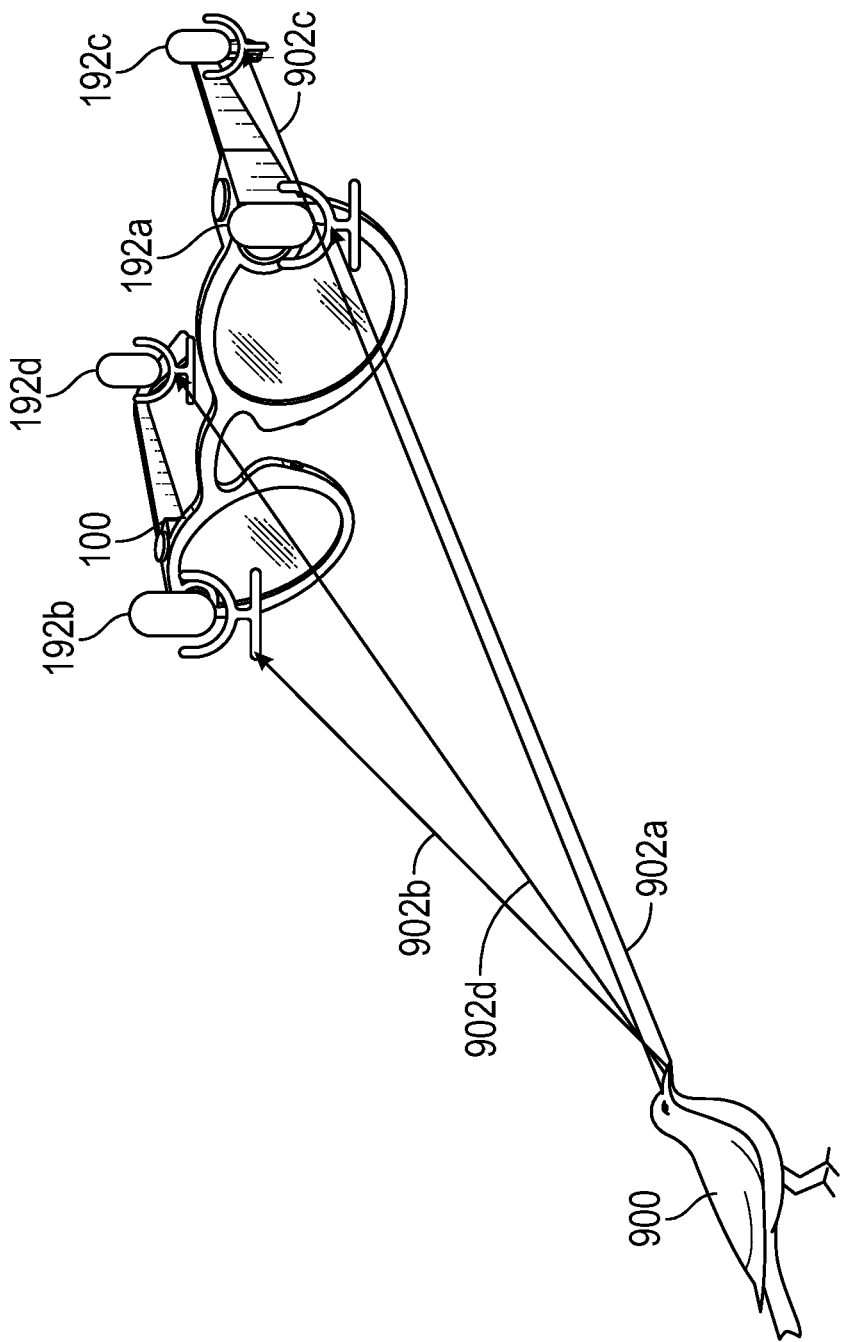
FIGS. 9A and 9B are illustrations depicting another example use of the eyewear device.
Figure 9B:
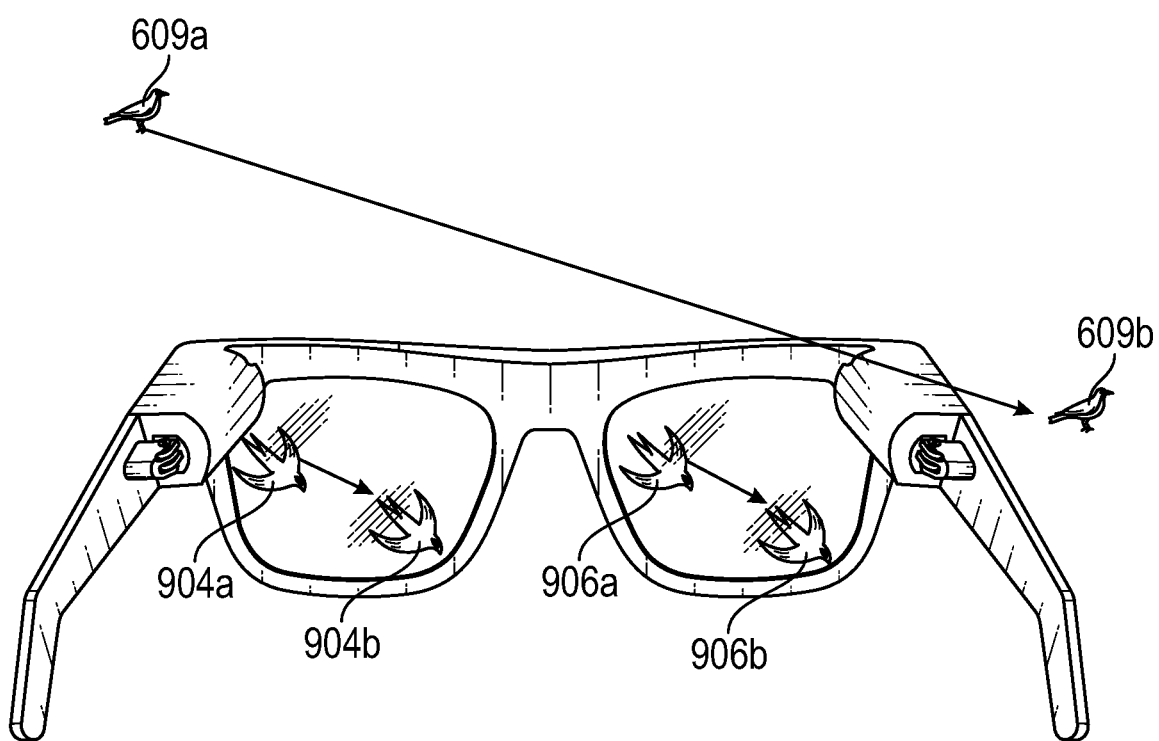

FIG. 9A depicts another example. In FIG. 9A, a bird 900 is located in the environment of the eyewear device. In this example, the microphones 192 detect audio information including an audio signal from the bird 900. The eyewear device 100 identifies the audio signal within the audio information, detects the direction from which the audio signal is coming from, and classifies the audio signal. In this example the eyewear device 100 classifies the object as a bird 900 (generally or a specific type of bird based on training of the CNN). The eyewear device 100 presents an application associated with the classification (e.g., an application that creates a virtual image of a bird) where the application is responsive to the direction of the bird 900 with respect to the eyewear device. As shown in FIG. 9B as the bird moves from a first physical bird position 609a to a second physical bird position 609b, a corresponding virtual image moves from a first virtual bird position 904a/906a to a second virtual bird position 904b/906b.

In one example, the bird 900 is obscured from being viewed by cameras of the eyewear device 100 (e.g., hidden from view by foliage, outside the field of view of the cameras, or too far away) and the identification of the bird and the direction of the bird is solely based on audio signals. Thus, information about the bird is obtained and presented even though the bird is not visible by the cameras of the eyewear device. In another example, the bird 900 is visible by the cameras of the eyewear device and computer vision may be used to supplement the audio information for use in identifying the object and determining its direction. In this example, the virtual image of a bird 904 may be placed over the actual bird 900.

The process of determining whether a detected hand shape matches a predefined gesture, in some implementations, involves comparing the pixel-level data about the hand shape in one or more captured frames of video data to the collection of hand gestures stored in the hand gesture library 480. The detected hand shape data may include three-dimensional coordinates for the wrist, up to fifteen interphalangeal joints, up to five fingertips, and other skeletal or soft-tissue landmarks found in a captured frame. These data are compared to hand gesture data stored in the hand gesture library 480 until the best match is found. In some examples, the process includes calculating the sum of the geodesic distances between the detected hand shape fingertip coordinates and a set of fingertip coordinates for each hand gesture stored in the library 480. A sum that is within a configurable threshold accuracy value represents a match.

In another example implementation, the process of determining whether a detected hand shape matches a predefined gesture, involves using a machine-learning algorithm to compare the pixel-level data about the hand shape in one or more captured frames of video data to a collection of images that include hand gestures.

In another example implementation, the process of identifying whether a physical object matches an object in the object database 483 involves using a machine-learning algorithm to compare the pixel-level data about the physical object in one or more captured frames of video data to a collection of images that include physical objects.

In another example implementation, the process of identifying an object based on an audio signal matching an audio signal for known objects involves using a machine-learning algorithm to compare the audio signal to a collection of audio signals associated with known objects.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer perception, mathematical models attempt to emulate the tasks accomplished by the human visual system and the human hearing system, with the goal of using computers to extract information from an image and audio signals to achieve an accurate understanding of the contents of the image and the audio signal. Computer vision algorithms have been developed for a variety of fields, including artificial intelligence and autonomous navigation, to extract and analyze data in digital images and video. Likewise, computer hearing algorithms have been developed for a variety of fields, including artificial intelligence, to extract and analyze data in digital audio signals.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video, and audio information, including digital audio signals. The connectivity pattern between nodes in a CNN is typically modeled after the organization of the human visual cortex, which includes individual neurons arranged to respond to overlapping regions in a visual field or audio range. A neural network that is suitable for use in the determining process described herein is based on one of the following architectures: VGG16, VGG19, ResNet50, Inception V3, Xception, or other CNN-compatible architectures.

In the machine-learning example, the processor 432 determines whether a detected hand shape substantially matches a predefined gesture using a machine-trained algorithm referred to as a hand feature model. The processor 432 is configured to access the hand feature model, trained through machine learning, and applies the hand feature model to identify and locate features of the hand shape in one or more frames of the video data. Although examples are described with reference to detecting hand shapes, similar techniques can be used to recognize other physical objects based on models trained with known objects and to recognize objects by their audio signals based on models trained with audio signal from known objects.

In one example implementation, the trained hand feature model receives a frame of video data which contains a detected hand shape and abstracts the image in the frame into layers for analysis. Data in each layer is compared to hand gesture data stored in the hand gesture library 480, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as "pointer gesture present" if the detected hand shape matches the pointer gesture from the library 480.

Figure 10:
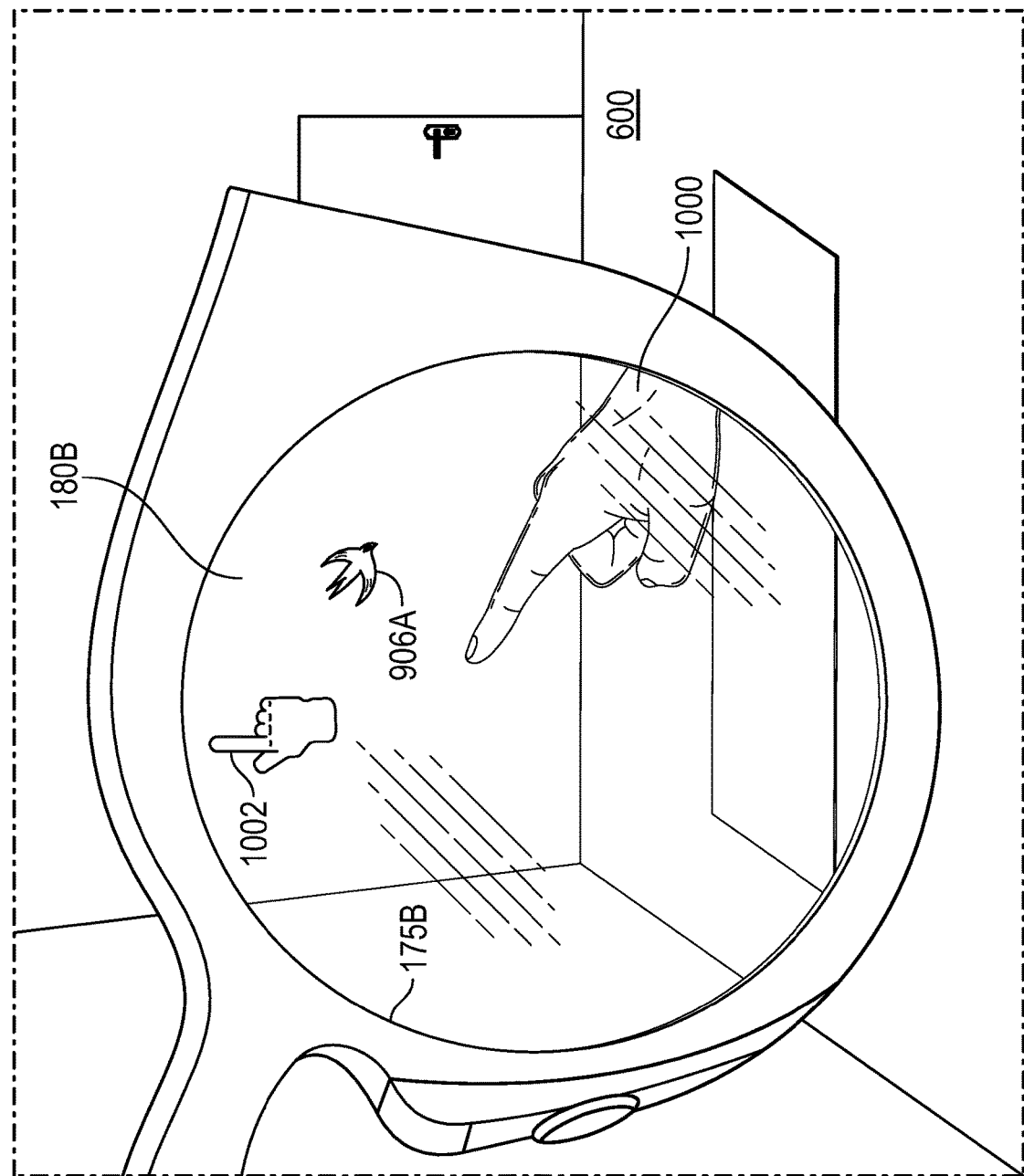
FIG. 10 is a perspective illustration of a virtual object presented on a display of an eyewear device.

In some example implementations, the processor 432, in response to detecting a pointing gesture, presents on the display 180A-B an indicator 1002 (see FIG. 10). The indicator 1002 informs the wearer that a predefined gesture has been detected. The indicator 1002 in one example is an object, such as the pointing finger shown in FIG. 10. The indicator 1002 may include one or more visible, audible, tactile, and other elements to inform or alert the wearer that a pointer gesture has been detected. A user may move the indicator 1002 by moving the detected hand gesture within the field of view of the eyewear device 100.

The functionality described herein for the eyewear device 100, the mobile device 401, the remote device 402, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to produce one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™ WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. An eyewear device comprising:
a microphone system;
a presentation system;
a support structure configured to be head-mounted on a user, the support structure supporting the microphone system and the presentation system; and
a processor, a memory, and programming in the memory, wherein execution of the programming by the processor configures the eyewear device to:
capture, with the microphone system, audio information of an environment surrounding the eyewear device;
identify an audio signal within the audio information, wherein to identify the audio signal within the audio information the processor applies a signal discrimination filter to the audio information;
detect a direction of the audio signal with respect to the eyewear device, wherein to detect the direction of the audio signal with respect to the eyewear device the processor applies a beam forming algorithm;
classify the audio signal to identify an object;
produce a visual overlay including a virtual image of the object; and
present, by the presentation system, the visual overlay including the virtual image of the object positioned responsive to the direction of the audio signal.

2. The eyewear device of claim 1, wherein the presentation system includes a speaker system and wherein execution of the programming by the processor further configures the eyewear device to:
produce a spatial filter responsive to the direction of the audio signal;
apply the spatial filter to the audio signal;
amplify the audio signal; and
present, with the speaker system, the amplified audio signal in the direction of the audio signal using the applied spatial filter.

3. The eyewear device of claim 2, wherein execution of the programming by the processor further configures the eyewear device to:
determine an intensity of the audio signal; and
classify the audio into one of at least two intensity classification levels;
wherein the amplified audio signal is responsive to the classified intensity classification level.

4. The eyewear device of claim 1, wherein the presentation system includes a speaker system and wherein execution of the programming by the processor further configures the eyewear device to:
classify the audio signal into one of a plurality of predefined classifications, each of the plurality of predefined classifications associated with a respective application;
produce a spatial filter responsive to the direction of the audio signal;
generate an audio track corresponding to the one of the plurality of predefined classifications;
apply the spatial filter to the audio track; and
present, with the speaker system, the audio track with the applied spatial filter.

5. The eyewear device of claim 1, wherein the presentation system includes a display system and wherein to present the visual overlay the processor configures the eyewear device to:
present the visual overlay on the display system.

6. The eyewear device of claim 5, wherein to present the visual overlay the processor configures the eyewear device to:
register the virtual image of the object to the detected direction with respect to the eyewear device;
wherein to produce and present the visual overlay the processor configures the eyewear device to include the virtual image of the object in the visual overlay in a position corresponding to the detected direction.

7. The eyewear device of claim 6, wherein execution of the programming by the processor further configures the eyewear device to:
detect a subsequent direction of the audio signal; and
produce a subsequent visual overlay including the virtual image of the object in another position corresponding to the subsequent detected direction to present on the display system.

8. The eyewear device of claim 1, wherein the presentation system includes a speaker system and a display system and wherein execution of the programming by the processor further configures the eyewear device to:
present, with the speaker system, an audio track in the direction of the audio signal; and
present, with the display system, the virtual image of the object in a direction corresponding to the direction of the audio signal.

9. The eyewear device of claim 1, wherein the presentation system includes a speaker system and a display system and the eyewear device further comprises:
a camera system having a field of view and supported by the support structure, wherein execution of the programming by the processor further configures the eyewear device to:
capture images within the field of view;
present, with the speaker system, an audio track in the direction of the audio signal;
present, with the display system, the virtual image of the object in the direction corresponding to the direction of the audio signal when the object corresponding to the audio track is not within the field of view; and
present, with the display system, the virtual image of the object over the object when the object corresponding to the audio track is within the field of view.

10. A method for use with an eyewear device including a microphone system, a presentation system and a support structure configured to be head-mounted on a user, the method comprising:
capturing, with the microphone system, audio information of an environment surrounding an eyewear device;
identifying an audio signal within the audio information by applying a signal discrimination filter to the audio information;
detecting a direction of the audio signal with respect to the eyewear device by applying a beam forming algorithm;
classifying the audio signal to identify an object;
producing a visual overlay including a virtual image of the object based on the classified audio; and
presenting, by the presentation system, the visual overlay including the virtual image of the object positioned responsive to the direction of the audio signal.

11. The method of claim 10, wherein the presentation system includes a speaker system and wherein the method further comprises:

producing a spatial filter responsive to the direction of the audio signal;

applying the spatial filter to the audio signal;

amplifying the audio signal; and presenting, with the speaker system, the amplified audio signal with the applied spatial filter.

12. The method of claim 11, further comprising:

determining an intensity of the audio signal; and classifying the audio into one of at least two intensity classification levels;

wherein the presenting of the amplified audio signal is responsive to the classified intensity classification level.

13. The method of claim 10, wherein the presentation system includes a speaker system and wherein the method further comprises:

classifying the audio signal into one of a plurality of predefined classifications, each of the plurality of predefined classifications associated with a respective application;

producing a spatial filter responsive to the direction of the audio signal;

generating an audio track corresponding to the one of the plurality of predefined classifications;

applying the spatial filter to the audio track; and presenting, with the speaker system, the audio track with the applied spatial filter.

14. The method of claim 10, wherein the presentation system includes a display system and wherein the presenting the visual overlay comprises:

presenting the visual overlay on the display system.

15. The method of claim 10, wherein the presentation system includes a speaker system and a display system and wherein the method further comprises:

presenting, with the speaker system, an audio track in the direction of the audio signal;

wherein the presenting the visual overlay comprises presenting the visual overlay on the display system in the direction of the audio signal.

16. The method of claim 10, wherein the eyewear device includes a camera system having a field of view, the presentation system includes a speaker system and a display system, and the method further comprises:

capturing images within the field of view; and presenting, with the speaker system, an audio track in the direction of the audio signal;

wherein presenting the virtual image of the object comprises presenting the virtual image of the object on the display system in the direction of the audio signal when the object corresponding to the audio track is not within the field of view and presenting the virtual image of the object over the object when the object corresponding to the audio track is within the field of view.

17. A non-transitory computer-readable medium storing program code for use with an eyewear device configured to be head mounted on a user, the eyewear device comprising a processor, a memory, a microphone system, and a presentation system, the program code, when executed, is operative to cause a processor to:

capture, with the microphone system, audio information of an environment surrounding the eyewear device;

identify an audio signal within the audio information, wherein to identify the audio signal within the audio information the processor applies a signal discrimination filter to the audio information;

detect a direction of the audio signal with respect to the eyewear device, wherein to detect the direction of the audio signal with respect to the eyewear device the processor applies a beam forming algorithm;

classify the audio signal to identify an object;

produce a visual overlay including a virtual image of the object based on the classified audio; and present, by the presentation system, the visual overlay including the virtual image of the object positioned responsive to the direction of the audio signal.

18. The non-transitory computer-readable medium of claim 17, wherein the presentation system includes a speaker system and wherein the program code is further operative to cause the processor to:

produce a spatial filter responsive to the direction of the audio signal;

apply the spatial filter to the audio signal;

amplify the audio signal; and present, with the speaker system, the amplified audio signal with the applied spatial filter.

19. The non-transitory computer-readable medium of claim 17, wherein the presentation system includes a speaker system and wherein the program code is further operative to cause the processor to:

classify the audio signal into one of a plurality of predefined classifications, each of the plurality of predefined classifications associated with a respective application;

produce a spatial filter responsive to the direction of the audio signal;

generate an audio track corresponding to the one of the plurality of predefined classifications;

apply the spatial filter to the audio track; and present, with the speaker system, the audio track with the applied spatial filter.

20. The non-transitory computer-readable medium of claim 17, wherein the eyewear device further comprises a camera having a field of view, the presentation system includes a speaker system and a display system, and the program code is further operative to cause the processor to:

capture images within the field of view using the camera; and present, with the speaker system, an audio track in the direction of the audio signal;

wherein the presenting the virtual image of the object comprises presenting the virtual image of the object on the display system in the direction of the audio signal when the object corresponding to the audio track is not within the field of view and presenting the virtual image of the object over the object when the object corresponding to the audio track is within the field of view.

* * * * *